United States Patent
Wang et al.

(10) Patent No.: US 10,184,017 B2
(45) Date of Patent: Jan. 22, 2019

(54) CATALYST COMPONENT FOR PROPENE POLYMERIZATION, PREPARATION METHOD THEREOF, AND CATALYST CONTAINING THE SAME

(71) Applicants: China Petroleum & Chemical Corporation, Beijing (CN); Beijing Research Institute of Chemical Industry, China Petroleum & Chemical Corporation, Beijing (CN)

(72) Inventors: Jun Wang, Beijing (CN); Mingzhi Gao, Beijing (CN); Haitao Liu, Beijing (CN); Jing Ma, Beijing (CN); Jianhua Chen, Beijing (CN); Xiaoxia Cai, Beijing (CN); Jixing Ma, Beijing (CN); Changxiu Li, Beijing (CN); Jianjun Hu, Beijing (CN); Xiaofan Zhang, Beijing (CN); Xianzhong Li, Beijing (CN); Zhihui Zhang, Beijing (CN); Ruilin Duan, Beijing (CN); Linna Yang, Beijing (CN); Changyou Ma, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 23 days.

(21) Appl. No.: 15/306,247

(22) PCT Filed: Apr. 24, 2015

(86) PCT No.: PCT/CN2015/077379
§ 371 (c)(1),
(2) Date: Oct. 24, 2016

(87) PCT Pub. No.: WO2015/161825
PCT Pub. Date: Oct. 29, 2015

(65) Prior Publication Data
US 2017/0044280 A1 Feb. 16, 2017

(30) Foreign Application Priority Data

| Apr. 24, 2014 | (CN) | .......................... 2014 1 0168579 |
| Apr. 24, 2014 | (CN) | .......................... 2014 1 0168730 |
| Apr. 24, 2014 | (CN) | .......................... 2014 1 0168779 |
| Apr. 24, 2014 | (CN) | .......................... 2014 1 0168798 |
| Apr. 24, 2014 | (CN) | .......................... 2014 1 0168805 |
| Apr. 24, 2014 | (CN) | .......................... 2014 1 0169225 |

(51) Int. Cl.
*C08F 110/06* (2006.01)
*C08F 4/649* (2006.01)
(Continued)

(52) U.S. Cl.
CPC ............ *C08F 110/06* (2013.01); *C08F 4/649* (2013.01); *C08F 4/651* (2013.01); *C08F 4/654* (2013.01); *C08F 10/06* (2013.01)

(58) Field of Classification Search
CPC ........ C08F 110/06; C08F 10/06; C08F 4/649; C08F 4/651; C08F 4/654
See application file for complete search history.

(56) References Cited

FOREIGN PATENT DOCUMENTS

| CN | 101205264 A | 6/2008 |
| CN | 101735346 A | 6/2010 |
| (Continued) |

OTHER PUBLICATIONS

International Search Report from the State Intellectual Property Office of the P.R. China for International Application No. PCT/CN2015/077379 dated Jul. 2, 2015.

*Primary Examiner* — Catherine S Branch
(74) *Attorney, Agent, or Firm* — Finnegan, Henderson, Farabow, Garrett & Dunner, LLP

(57) ABSTRACT

The present invention discloses a catalyst component for propene polymerization, comprising titanium, magnesium, halogen, and internal electron donor A, wherein said internal electron donor A is selected from the compounds as shown in Formula I,

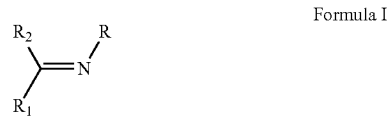

Formula I in Formula I, R is selected from hydrogen, hydroxyl, and substituted or unsubstituted $C_1$-$C_{30}$ hydrocarbyl, preferably from hydrogen, hydroxyl, and substituted or unsubstituted $C_1$-$C_{20}$ alkyl, $C_6$-$C_{30}$ aryl, $C_6$-$C_{30}$ heteroaryl, $C_7$-$C_{30}$ alkylaryl and $C_7$-$C_{30}$ arylalkyl; $R_1$ and $R_2$ may be identical to or different from each other, and are selected from hydrogen and substituted or unsubstituted $C_1$-$C_{30}$ hydrocarbyl, preferably from hydrogen and substituted or unsubstituted $C_1$-$C_{20}$ alkyl, $C_6$-$C_{30}$ aryl, $C_7$-$C_{30}$ alkylaryl and $C_7$-$C_{30}$ arylalkyl. According to the present invention, by using the compound as shown in Formula I as internal electron donor compound for propene polymerization, the catalyst has a higher activity, and a slow rate of delay of activity. The obtained polymer has not only a wider molecular weight distribution, but also a high melt index and isotacticity.

84 Claims, No Drawings

(51) Int. Cl.
    *C08F 4/651*     (2006.01)
    *C08F 4/654*     (2006.01)
    *C08F 10/06*     (2006.01)

(56) References Cited

FOREIGN PATENT DOCUMENTS

| | | |
|---|---|---|
| CN | 101896509 A | 11/2010 |
| WO | WO 01/25297 A1 | 4/2001 |

CATALYST COMPONENT FOR PROPENE POLYMERIZATION, PREPARATION METHOD THEREOF, AND CATALYST CONTAINING THE SAME

CROSS-REFERENCE TO RELATED APPLICATIONS

The present application claims the priority of Chinese patent applications CN201410168805.7, CN201410169225.X, CN201410168779.8, CN201410168730.2, CN201410168798.0, and CN201410168579.2, the entirety of which is incorporated herein by reference.

TECHNICAL FIELD

The present invention relates to the technical field of olefin polymerization, and in particular, to a catalyst component for propene polymerization. The present invention further relates to a preparation method of said catalyst component, and a catalyst containing said catalyst component.

TECHNICAL BACKGROUND

Generally, catalysts used for olefin polymerization can be classified into three categories: traditional Ziegler-Natta catalyst, metallocene catalyst, and non-metallocene catalyst. For traditional propene polymerization Ziegler-Nattacatalyst, titanium catalysts used for propene polymerization mainly use magnesium, titanium, halogen, and electron donor as basic components, wherein electron donor compounds are indispensible elements of catalyst components. With the development of electron donor compounds in catalysts, olefin polymerization catalysts are also constantly undated, and the development thereof experiences the $1^{st}$ generation of $TiCl_3AlCl_3/AlEt_2Cl$ system, the $2^{nd}$ generation of $TiCl_3/AlEt_2Cl$ system, the $3^{rd}$ generation of $TiCl_4.ED.MgCl_2/AlR_3.ED$ system using magnesium chloride as carriers, monoester or aromatic diester as internal electron donor, and silane as external electron donor, and the newly developed catalyst system using diether compounds and diester compounds as internal electron donors. The activity of catalysts for catalytic polymerization reaction and the isotacticity of the obtained polymers are greatly improved. Till now, many internal electron donor components have been disclosed, these components including, for example, monocarboxylic esters or multiple carboxylic esters, acid anhydrides, ketone, monoethers or multiple ethers, alcohols, amines, and derivatives thereof, and so on, wherein commonly used ones are aromatic dicarboxylic esters such as di-n-butyl phthalate or di-n-butyl diisobutyl ester, and so on. Reference can be made to U.S. Pat. No. 4,784,983, U.S. Pat. No. 4,971,937 and European patent EP0728769 disclose components of catalysts used for olefin polymerization, wherein 1,3-diether compounds having two ether groups are used as electron donors, such compounds including, for example, 2-isopropyl-2-isopentyl-1,3-dimethoxy propane, 2,2-diisobutyl-1,3-dimethoxy propane, and 9,9-di(methoxymethyl) fluorene, etc. Later, aliphatic dicarboxylic ester compounds, such as succinate, malonic ester, glutarate, and so on, are disclosed (see WO98/56830, WO98/56834, WO01/57099, WO01/63231, and WO00/55215). However, catalysts prepared with existing internal electron donor compounds generally have defects such as rapid decrease of activity. Besides, taking diether catalysts as an example, diether catalysts have a high activity, and can obtain a polymer with high isotacticity without external electron donors, and have a good hydrogen response, but the molecular weight distribution thereof is very narrow, and the activity thereof decreases fast while diester catalysts can obtain a polymer with relatively wide molecular weight distribution and rigid-tough balance, the hydrogen response thereof is not that good.

The present invention aims to provide a new catalyst component and catalyst, wherein the catalyst has a high activity and high long-term stability, and can widen the molecular weight distribution of the obtained polymer, and can enable the obtained polymer to have a high melt index and isotacticity. The obtained polymer has a broad application prospect.

SUMMARY OF THE INVENTION

Aiming at the deficiencies of the prior art, the present invention provides a catalyst component for propene polymerization, preparation method thereof and a catalyst containing the same. When used for propene polymerization, the catalyst provided by the present invention has a higher activity, orientation ability, good hydrogen response, and high stability (i.e. the activity of the catalyst decreases slowly). The obtained polymer has not only a wider molecular weight distribution, but also a high melt index and isotacticity.

According to one aspect of the present invention, provided is a catalyst component for propene polymerization, comprising titanium, magnesium, halogen and internal electron donor A, said internal electron donor A being at least one selected from compounds as shown in Formula I,

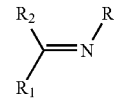

Formula I in Formula I, R is selected from hydrogen, hydroxyl, and substituted or unsubstituted $C_1$-$C_{30}$ hydrocarbyl, preferably from hydrogen, hydroxyl, and substituted or unsubstituted $C_1$-$C_{20}$ alkyl, $C_6$-$C_{30}$ aryl, $C_6$-$C_{30}$ heteroaryl, $C_7$-$C_{30}$ alkylaryl and $C_7$-$C_{30}$ arylalkyl; $R_1$ and $R_2$ may be identical to or different from each other, independently selected from hydrogen and substituted or unsubstituted $C_1$-$C_{30}$ hydrocarbyl, preferably from hydrogen and substituted or unsubstituted $C_1$-$C_{20}$ alkyl, $C_6$-$C_{30}$ aryl, $C_7$-$C_{30}$ alkylaryl and $C_7$-$C_{30}$ arylalkyl.

According to one embodiment of the present invention, R is selected from hydrogen, hydroxyl, $C_1$-$C_{10}$ alkyl, and halogen or hydroxy substituted $C_6$-$C_{10}$ aryl, $C_6$-$C_{15}$ heteroaryl, $C_7$-$C_{15}$ arylalkyl and $C_7$-$C_{15}$ alkylaryl; $R_1$ and $R_2$ may be identical to or different from each other, and are selected from hydrogen, $C_1$-$C_{10}$ alkyl and substituted or unsubstituted $C_6$-$C_{20}$ aryl, $C_7$-$C_{20}$ alkylaryl, and $C_7$-$C_{20}$ arylalkyl.

According to the catalyst component (or be referred to as solid catalyst component, catalyst solid component) of the present invention, the substituted $C_1$-$C_{30}$ hydrocarbyl, $C_1$-$C_{20}$ hydrocarbyl, $C_1$-$C_{20}$ alkyl, $C_6$-$C_{30}$ aryl, $C_6$-$C_{30}$ heteroaryl, $C_7$-$C_{30}$ alkylaryl, $C_7$-$C_{30}$ arylalkyl and so on mean that a hydrogen atom or carbon atom of these groups is substituted. For example, the hydrogen atom or carbon atom of the above mentioned hydrocarbyl, ring group, aryl, or alkylaryl and so on can be substituted by halogen, heteroatom (such as nitrogen atom, oxygen atom, etc.), hydroxy, alkyl, or alkoxy optionally. Said hydrocarbyl can contain a double bond and others as well.

According to another embodiment of the present invention, said internal electron donor A is at least one selected from compounds as shown in Formula II,

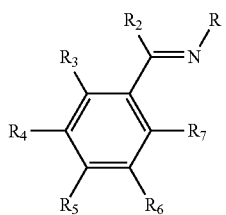

Formula II

R is selected from hydrogen, hydroxyl, and substituted or unsubstituted $C_1$-$C_{30}$ hydrocarbyl, preferably from hydrogen, hydroxyl, and substituted or unsubstituted $C_1$-$C_{20}$ alkyl, $C_6$-$C_{30}$ aryl, $C_6$-$C_{30}$ heteroaryl, $C_7$-$C_{30}$ alkylaryl and $C_7$-$C_{30}$ arylalkyl, more preferably from hydrogen, hydroxyl, $C_1$-$C_{10}$ alkyl, and halogen or hydroxy substituted $C_6$-$C_{10}$ aryl, $C_6$-$C_{15}$ heteroaryl, $C_7$-$C_{15}$ arylalkyl and $C_7$-$C_{15}$ alkylaryl;

$R_2$ is selected from hydrogen, and substituted or unsubstituted $C_1$-$C_{30}$ hydrocarbyl, preferably from hydrogen, and substituted or unsubstituted $C_1$-$C_{20}$ alkyl, $C_6$-$C_{30}$ aryl, $C_7$-$C_{30}$ alkylaryl and $C_7$-$C_{30}$ arylalkyl; more preferably from hydrogen, $C_1$-$C_{10}$ alkyl, and substituted or unsubstituted $C_6$-$C_{20}$ aryl, $C_7$-$C_{20}$ alkylaryl and $C_7$-$C_{20}$ arylalkyl;

$R_3$-$R_7$ may be identical to or different from each other, each independently selected from hydrogen, halogen atoms, hydroxyl, $C_1$-$C_{10}$ alkyl, $C_1$-$C_{10}$ alkoxy, $C_6$-$C_{10}$ aryl, $C_7$-$C_{12}$ alkylaryl, $C_7$-$C_{12}$ arylalkyl, and $C_2$-$C_{12}$ alkenyl, preferably from hydrogen, halogen atoms, hydroxyl, $C_1$-$C_6$ alkyl, $C_1$-$C_6$ alkoxy, phenyl, $C_7$-$C_{12}$ alkylphenyl, $C_7$-$C_{12}$ phenyl alkyl, and $C_2$-$C_6$ alkenyl; $R_3$-$R_7$ can be optionally bonded together to form a ring.

It is known according to the present invention that, the compounds as shown in Formula I include those as shown in formula II. According to another embodiment of the catalyst component of the present invention, said internal electron donor A contains, but not limited to, N-butylidene aniline, 2,6-dimethyl-N-butylidene aniline, 4-chloro-N-butylidene aniline, N-(2-methylpropylidene)aniline, N-butylideneparabromoaniline, 2,6-diisopropyl-N-(2-methylpropylidene)aniline, 2,6-diisopropyl-N-butylidene aniline, 4-trifluoromethyl-N-butylidene aniline, 2,4,6-trimethyl-N-butylidene aniline, N-(2-methylpropylidene)-1-butylamine, N-(2-methylpropylidene)-2-butylamine, N-hexylidene-1-hexylamine, N-hexylidene-1-octylamine, N-pentylidene-1-octylamine, 2,6-diisopropyl-N-heptamethyleneaniline, 2,6-diisopropyl-N-(2,2-diphenyl ethylidene)aniline, 2,6-dimethyl-N-(2,2-diphenyl ethylidene)aniline, N-(2-phenyl ethylidene)-8-amino quinoline, N-butylidene-3-amino quinoline, 2,6-dimethyl-N-hexylideneaniline, 2,6-diisopropyl-N-hexylideneaniline, 2,6-diisopropyl-N-(2-methylpropylidene)aniline, 2,6-dimethyl-N-(2-methylpropylidene) aniline, 2,6-diisopropyl-N-(diphenylmethylene)aniline, 2,6-dimethyl-N-(diphenylmethylene)aniline, 2,6-diisopropyl-N-(2-phenyl ethylidene)aniline, 2,6-dimethyl-N-(2-phenylethylidene)aniline, 4-methyl-N-(3-heptamethylene) aniline, N-heptamethyleneaniline, 2,6-diisopropyl-N-pentylideneaniline, 2,6-diisopropyl-N-(2-pentylidene) aniline, N-(3-pentylidene)-1-naphthylamine, N-(4-heptamethylene)-1-naphthylamine, 4-hydroxy-N-diphenylmethylene-1-naphthylamine, N-diphenylmethylenebenzylamine, N-(2-phenyl ethylidene) benzylamine, 2,6-dimethyl-N-(2,2-diphenyl ethylidene)aniline, 2,6-diisopropylN-(2,2-diphenyl ethylidene)aniline, N-(2,2-diphenyl ethylidene)aniline, N-(2,2-diphenyl ethylidene)-8-amino quinoline, N-(2,2-diphenyl ethylidene)-3-amino quinoline, 2-(phenylimino)methyl-4-tertiary butylphenol, 2-(phenylimino)methyl-4,6-ditertiary butylphenol, 2-(phenylimino)methyl-4-chlorophenol, 2-(phenylimino)methyl-4-fluorophenol, 2-(phenylimino)methyl-4,6-dichlorophenol, 2-(phenylimino)methyl-4-methylphenol, 2-(phenylimino)methyl-4-isopropylphenol, 2-(phenylimino) methylphenol, 2-(phenylimino)methyl-4-phenyl phenol, 2-(2,6-diisopropylphenylimino)methyl-4,6-dimethylphenol, 2-(2,6-diisopropylphenylimino)methyl-6-phenyl phenol, 2-(2,6-diisopropylphenylimino)methyl-4-isopropylphenol, 2-(butylimino)methyl-4-tertiary butylphenol, 2-(butylimino)methyl-4,6-ditertiary butylphenol, 2-(hexylimino) methyl-4-tertiary butylphenol, 2-(hexylimino)methyl-4,6-ditertiary butylphenol, 2-(octylimino)methyl-4-tertiary butylphenol, 2-(octylimino)methyl-4,6-ditertiary butylphenol, 2-(2,6-diisopropylphenylimino)methyl-4-tertiary butylphenol, 2-(2,6-diisopropylphenylimino)methyl-4,6-ditertiary butylphenol, 2-(phenylimino)methyl-4,6-ditertiary butylphenol, 2-(phenylimino)methyl-6-tertiary butylphenol, 2-(2,6-diisopropylphenylimino)methyl-4,6-dimethylphenol, 2-(2,6-dimethylphenylimino)methyl-4-ditertiary butylphenol, 2-(2,6-dimethylphenylimino)methyl-4,6-ditertiary butylphenol, N-(2-methoxy-5-tertiary butylphenylmethylene)-2,6-diisopropylaniline, N-(2-methoxy-5-tertiary butylphenylmethylene)-2,6-dimethylaniline, 2-(2,6-dimethylphenylimino)methyl-4-methoxy-6-tertiary butylphenol, N-phenylmethylene-2,6-diisopropylaniline, 2-(4-chlorophenylimino)methyl-4,6-ditertiary butylphenol, N-p-chlorophenylmethylene-2,6-diisopropylaniline, N-(4-tertiary butylphenylmethylene)-2,6-diisopropylaniline, N-phenylmethylene-2,6-dimethylaniline, N-(2,4-dichlorophenylmethylene)-2,6-dimethylaniline, N-(3,5-ditertiary butylphenylmethylene)aniline, N-(2,4,6-trifluorophenylmethylene)-2,6-dimethylaniline, [2-(2,3,4,5,6-pentafluorophenylimino)methyl-4,6-ditertiary butylphenol, N-(2-methoxynaphthylmethylene)-2,6-diisopropylaniline, 2-(2,6-diisopropylphenylimino)methylphenol, 2-(2,6-dimethylphenylimino)methyl-6-tertiary butylphenol, 2-(2,6-diisopropylphenylimino)methyl-6-tertiary butylphenol, N-(2-methoxy-3-tertiary butylphenylmethylene)-2,6-diisopropylaniline, N-(3,5-ditertiary butylphenylmethylene)-1-naphthylamine, N-(3,5-ditertiary butylphenylmethylene)-2-naphthylamine, 2-(2-naphthylimino)methylphenol, 2-(4-quinolylimino)methyl-4,6-ditertiary butylphenol, 2-(3-quinolylimino)methyl-4,6-ditertiary butylphenol, 2-(8-quinolylimino)methyl-4,6-ditertiary butylphenol, N-(2-naphthylmethylene)-2,6-diisopropylaniline, N-(1-naphthylmethylene)-2,6-diisopropylaniline, N-(1-naphthylmethylene)-2,6-dimethylaniline, N-(2-anthrylmethylene)-2,6-diisopropylaniline, N-(1-anthrylmethylene)-2,6-dimethylaniline, 2-(2-benzylimino)-4,6-ditertiary butylphenol, 2-(3,5-ditertiary butyl-2hydroxy) benzylaminophenol, and 2-(3,5-ditertiary butyl-2hydroxybenzylimino-1-naphthol.

According to the present invention, said internal electron donor A is an imine compound, the preparation method of which is a known technique. For example, it can be prepared by dissolving a aldehyde or ketone compound in an organic solvent, and then adding an amine to obtain an mixture, the mixture being refluxed under certain conditions (acidic or basic) for condensation to obtain a compound with the corresponding structure.

According to one embodiment of the catalyst component of the present invention, the weight content of internal electron donor A in the catalyst component is in a range of 0.01%-20% (eg. 0.05%-20% or 6%-20%), preferably 0.5%-15% (eg. 1%-15%), more preferably 2%-10%.

In the catalyst component, the content of titanium is in a range of 1.0 wt %-10.0 wt % (eg. 1.0-8.0 wt % or 1.5-10 wt %), preferably 2.0-6.0 wt % (eg. 2.0 wt %-5.0 wt %), more preferably 1.5 wt %-3.0 wt %; the content of magnesium is in a range of 5 wt %-50 wt % (eg. 10 wt %-40 wt %), preferably 10 wt %-30 wt % (eg. 20 wt %-30 wt %); the content of halogen is in a range of 10 wt %-70 wt % (eg. 30 wt %-70 wt %), preferably 40 wt %-60 wt % (eg. 52 wt %-60 wt %).

According to another embodiment of the present invention, the catalyst component further comprises internal electron donor B. In other words, the catalyst component contains magnesium, titanium, halogen, internal electron donor A, and internal electron donor B, wherein said internal electron donor B is at least one selected from the group consisting of esters, ethers, ketones, and amines, preferably from polycarboxylic acid ester compounds, diol ester compounds, and diether compounds.

In a preferred embodiment, the molar ratio of internal electron donor A to internal electron donor B is in a range from 1:10 to 10:1, preferably from 0.2:1 to 1:5, and more preferably from 0.5:1 to 2:1.

In the present invention, the polycarboxylic acid ester compounds include those disclosed in for example CN 85100997, the content of which is incorporated to the present invention as a reference. For example, said internal electron donor B is at least one selected from the group consisting of 2,3-bis(2-ethylbutyl)succinic acid diethyl ester, 2,3-diethyl-2-isopropylsuccinic acid diethyl ester, 2,3-diisopropylsuccinic acid diethyl ester, 2,3-ditertiary butylsuccinic acid diethyl ester, 2,3-diisobutylsuccinic acid diethyl ester, 2,3-(bistrimethylsilylalkyl)succinic acid diethyl ester, 2-(3,3,3-trifluoropropyl)-3-methyl succinic acid diethyl ester, 2,3-dineopentyl succinic acid diethyl ester, 2,3-diisopentyl succinic acid diethyl ester, 2,3-(1-trifluoromethyl-ethyl)succinic acid diethyl ester, 2-isopropyl-3-isobutyl succinic acid diethyl ester, 2-tertiary butyl-3-isopropyl succinic acid diethyl ester, 2-isopropyl-3-cyclohexyl succinic acid diethyl ester, 2-isopentyl-3-cyclohexyl succinic acid diethyl ester, 2,2,3,3-tetramethyl succinic acid diethyl ester, 2,2,3,3-tetraethyl succinic acid diethyl ester, 2,2,3,3-tetrapropyl succinic acid diethyl ester, 2,3-diethyl-2,3-diisopropyl disuccinic acid diethyl ester, 2,3-bis(2-ethylbutyl)succinic acid diisobutyl ester, 2,3-diethyl-2-isopropylsuccinic acid diisobutyl ester, 2,3-diisopropylsuccinic acid diisobutyl ester, 2,3-ditertiary butylsuccinic acid diisobutyl ester, 2,3-diisobutylsuccinic acid diisobutyl ester, 2,3-(bistrimethylsilylalkyl)succinic acid diisobutyl ester, 2-(3,3,3-trifluoropropyl)-3-methylsuccinic acid diisobutyl ester, 2,3-dineopentylsuccinic acid diisobutyl ester, 2,3-diisopentylsuccinic acid diisobutyl ester, 2,3-(1-trifluoromethyl-ethyl)succinic acid diisobutyl ester, 2-isopropyl-3-isobutyl succinic acid diisobutyl ester, 2-tertiary butyl-3-isopropylsuccinic acid diisobutyl ester, 2-isopropyl-3-cyclohexylsuccinic acid diisobutyl ester, 2-isopentyl-3-cyclohexylsuccinic acid diisobutyl ester, 2,2,3,3-tetramethylsuccinic acid diisobutyl ester, 2,2,3,3-tetraethylsuccinic acid diisobutyl ester, 2,2,3,3-tetrapropylsuccinic acid diisobutyl ester, 2,3-diethyl-2,3-diisopropyl disuccinic acid diisobutyl ester, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methyl phthalate, di-n-butyl 2-methyl phthalate, diisobutyl 2-propyl phthalate, di-n-butyl 2-propyl phthalate, diisobutyl 2-butyl phthalate, din-butyl 2-butyl phthalate, diisobutyl 2-propyl phthalate, di-n-butyl 2-propyl phthalate, diisobutyl 4-propyl phthalate, di-n-butyl 4-butyl phthalate, diisobutyl 2-chloro phthalate, di-n-butyl 2-chloro phthalate, diisobutyl 4-chloro phthalate, di-n-butyl 4-chloro phthalate, and di-n-butyl 4-methoxy phthalate.

According to one embodiment of the catalyst component of the present invention, said internal electron donor B is at least one selected from the diol ester compounds as shown in Formula III:

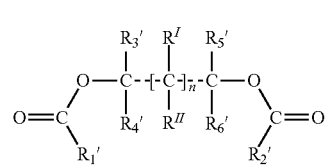

Formula III in Formula III, $R_1'$ and $R_2'$ may be identical to or different from each other, independently selected from $C_1$-$C_{20}$ alkyl, $C_6$-$C_{20}$ aryl, $C_7$-$C_{20}$ arylalkyl, and $C_7$-$C_{20}$ alkylaryl; $R_3'$-$R_6'$ may be identical to or different from each other, independently selected from hydrogen, $C_1$-$C_{20}$ alkyl, $C_6$-$C_{20}$ aryl, and $C_2$-$C_{12}$ alkenyl; $R^I$ and $R^{II}$ may be identical to or different from each other, independently selected from hydrogen, $C_1$-$C_{20}$ alkyl, $C_1$-$C_{20}$ crycloalkyl, $C_6$-$C_{20}$ aryl, $C_7$-$C_{20}$ arylalkyl, $C_9$-$C_{20}$ fused ring hydrocarbyl, and $C_2$-$C_2$ alkenyl; $R_3'$, $R_4'$, $R_5'$, $R_6'$, $R^I$, and $R^{II}$ can be optionally bonded together to form a ring; n is an intergar ranging from 0 to 10.

In a preferred embodiment, $R_1'$ and $R_2'$ may be identical to or different from each other, independently selected from $C_1$-$C_6$ alkyl, phenyl, substituted phenyl, and cinnamyl; $R_3'$-$R_6'$ may be identical to or different from each other, independently selected from hydrogen, $C_1$-$C_6$ alkyl, phenyl, substituted phenyl, and $C_2$-$C_6$ alkenyl; $R^I$ and $R^{II}$ may be identical to or different from each other, independently selected from hydrogen, $C_1$-$C_6$ alkyl, $C_1$-$C_6$ crycloalkyl, benzyl, phenyl, substituted phenyl, naphthyl, and $C_2$-$C_6$ alkenyl; n is an intergar ranging from 0 to 2; $R_3'$, $R_4'$, $R_5'$, $R_6'$, $R^I$, and $R^{II}$ can be optionally bonded together to form a ring, and preferably form an alicyclic ring or aromatic ring (such as benzene ring, fluorine ring, naphthalene an so on). As used herein, when n is 0, it means that the carbon atom bonded with both $R_3'$ and $R_4'$ is directly bonded with another carbon atom (i.e. the one bonded with both $R_5'$ and $R_6$).

According to the present invention, the diol ester compounds are those commonly used in the art, for example those disclosed in CN101885789A, the content of which is incorporated to the present invention. Said internal electron donor B contains, but not limited to one or more of the following compounds: 2-isopropyl-1,3-dibenzoyloxy propane, 2-butyl-1,3-dibenzoyloxy propane, 2-cyclohexyl-1,3-dibenzoyloxy propane, 2-benzyl-1,3-dibenzoyloxy propane, 2-phenyl-1,3-dibenzoyloxy propane, 2-(1-naphthyl)-1,3-dibenzoyloxy propane, 2-isopropyl-1,3-diethylcarboxylpropane, 2-isopropyl-2-isopentyl-1,3-dibenzoyloxy propane, 2-isopropyl-2-isobutyl-1,3-dibenzoyloxy propane, 2-isopropyl-2-isopentyl-1,3-di(4-butylbenzoyloxy) propane, 2-isopropyl-2-isopentyl-1,3-dipropylcarboxyl propane, 2-isopropyl-2-butyl-1,3-dibenzoyloxy propane, 2-isopropyl-2-isopentyl-1-benzoyloxy-3-butylcarboxyl propane, 2-isopropyl-2-isopentyl-1-benzoyloxy-3-cinnamylcarboxyl propane, 2-isopropyl-2-isopentyl-1-benzoyloxy-3-ethylcarboxyl propane, 2,2-dicyclopentyl-1,3-phenylcarboxyl propane, 2,2-dicyclohexyl-1,3-phenylcarboxyl propane, 2,2-dibutyl-1,3-phenylcarboxyl propane, 2,2-diisobutyl-1,3-phenylcarboxyl propane, 2,2-diisopropyl-1,3-diphenylcarboxyl propane, 2,2-diethyl-1,3-diphenylcarboxyl propane, 2-ethyl-2-butyl-1,3-diphenylcarboxyl propane, 2,4-dibenzoyloxy pentane, 3-ethyl-2,4-dibenzoyloxy pentane, 3-methyl-2,4-dibenzoyloxy pentane, 3-propyl-2,4-dibenzoyloxy pentane, 3-isopropyl-2,4-dibenzoyloxy pentane, 2,4-di(2-propylbenzoyloxy) pentane, 2,4-di(4-propylbenzoyloxy) pentane, 2,4-di(2,4-dimethylbenzoyloxy) pentane, 2,4-di(2,4-dichlorobenzoyloxy) pentane, 2,4-di(4-chlorobenzoyloxy) pentane, 2,4-di(4-isopropylbenzoyloxy) pentane, 2,4-di(4-butylbenzoyloxy) pentane, 2,4-di(4-isobutylbenzoyloxy) pentane, 3,5-dibenzoyloxy heptane, 4-ethyl-3,5-dibenzoyloxy heptane, 4-propyl-3,5-dibenzoyloxy heptane, 4-isopropyl-3,5-dibenzoyloxy heptane, 3,5-di(4-propylbenzoyloxy) heptane, 3,5-di(4-isopropylbenzoyloxy) heptane, 3,5-di(4-isobutylbenzoyloxy) heptane, 3,5-di(4-butylbenzoyloxy) heptane, 2-benzoyloxy-4-(4-isobutylbenzoyloxy) pentane, 2-benzoyloxy-4-(4-butylbenzoyloxy) pentane, 2-benzoyloxy-4-(4-propylbenzoyloxy) pentane, 3-benzoyloxy-5-(4-isobutylbenzoyloxy) heptane, 3-benzoyloxy-5-(4-butylbenzoyloxy) heptane, 3-benzoyloxy-5-(4-propylbenzoyloxy) heptane, 9,9-dibenzoyloxymethyl fluorene, 9,9-di(propylcarboxylmethyl) fluorene, 9,9-di(isobutylcarboxylmethyl) fluorene, 9,9-di(butylcarboxylmethyl) fluorene, 9,9-dibenzoyloxymethyl-4-tertiary butyl fluorene, 9,9-dibenzoyloxymethyl-4-propyl fluorene, 9,9-dibenzoyloxymethyl-1,2,3,4-tetrahydro fluorene, 9,9-dibenzoyloxymethyl-1,2,3,4,5,6,7,8-octahydro fluorene, 9,9-dibenzoyloxymethyl-2,3,6,7-diphenylpropylindene, 9,9-dibenzoyloxymethyl-1,8-dichloro fluorene, 7,7-dibenzoyloxymethyl-2,5-dinorbomadiene, 1,4-dibenzoyloxy butane, 2,3-diisopropyl-1,4-dibenzoyloxy butane, 2,3-dibutyl-1,4-dibenzoyloxy butane, 1,2-dibenzoyloxybeneze, 3-ethyl-1,2-dibenzoyloxybeneze, 4-n-butyl-1,2-dibenzoyloxybeneze, 1,2-di(n-butylbenzoyloxy)benzene, 1,2-di(isopropylbenzoyloxy)benzene, 3-n-propyl-1,2-dibenzoyloxybeneze, 3-isopropyl-1,2-dibenzoyloxybeneze, 3-isobutyl-1,2-dibenzoyloxybeneze, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, 2-propyl-1,8-dibenzoyloxynaphthalene, and 4-propyl-1,8-dibenzoyloxynaphthalene.

According to the present invention, the diether compounds can also be diether compounds commonly used in the art, for example, 1,3-diether compounds. Preferably, said internal electron donor B is at least one selected from the diether compounds as shown in Formula IV:

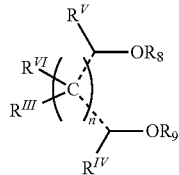

Formula IV in Formula IV, $R_8$ and $R_9$ may be identical to or different from each other, independently selected from $C_1$-$C_{20}$ alkyl; $R^{III}$-$R^{VI}$ may be identical to or different from each other, independently selected from hydrogen, $C_1$-$C_{20}$ alkyl, $C_1$-$C_{20}$ cycloalkyl, $C_6$-$C_{20}$ aryl, $C_6$-$C_{20}$ alkylaryl, $C_6$-$C_{20}$ arylalkyl, and $C_2$-$C_{12}$ alkenyl, and $R^{III}$-$R^{VI}$ can be optionally bonded together to form a ring; n is an intergar ranging from 0 to 10.

Preferably, $R_8$ and $R_9$ may be identical to or different from each other, independently selected from $C_1$-$C_6$ alkyl; $R^{III}$-$R^{VI}$ may be identical to or different from each other, independently selected from hydrogen, $C_1$-$C_6$ alkyl, $C_3$-$C_6$ cycloalkyl, phenyl, substituted phenyl, benzyl, naphthalene, and $C_2$-$C_6$ alkenyl; n is an intergar ranging from 0 to 2; $R^{III}$-$R_{VI}$ can be optionally bonded together to form a ring, preferably form an alicyclic ring or aromatic ring. When n is 0, it means that the carbon atom bonded with both $R^V$ and $OR_8$ is directly bonded with another carbon atom (i.e. the one bonded with both $OR_9$ and $R^{IV}$).

According to the present invention, said internal electron donor B contains but not limited to one or more of the following compounds: 2-isopropyl-1,3-dimethoxy propane, 2-butyl-1,3-dimethoxy propane, 2-cyclohexyl-1,3-dimethoxy propane, 2-benzyl-1,3-dimethoxy propane, 2-phenyl-1,3-dimethoxy propane, 2-(1-naphthyl)-1,3-dimethoxy propane, 2-isopropyl-2-isopentyl-1,3-dimethoxy propane, 2-isopropyl-2-isobutyl-1,3-dimethoxy propane, 2-isopropyl-2-butyl-1,3-dimethoxy propane, 2,2-dicyclopentyl-1,3-dibenzoyloxypropane, 2,2-dicyclohexyl-1,3-dimethoxy propane, 2,2-dibutyl-1,3-dimethoxy propane, 2,2-diisobutyl-1,3-dimethoxy propane, 2,2-diisopropyl-1,3-dimethoxy propane, 2,2-diethyl-1,3-dimethoxy propane, 2-ethyl-2-butyl-1,3-dimethoxy propane, 2,4-dimethoxy pentane, 3-ethyl-2,4-dimethoxy pentane, 3-methyl-2,4-dimethoxy pentane, 3-propyl-2,4-dimethoxy pentane, 3-isopropyl-2,4-dimethoxy pentane, 3,5-dimethoxy heptane, 4-ethyl-3,5-dimethoxy heptane, 4-propyl-3,5-dimethoxy heptane, 4-isopropyl-3,5-dimethoxy heptane, 9,9-dimethoxymethyl fluorene, 9,9-dimethoxymethyl-4-tertiary butyl fluorene, 9,9-dimethoxymethyl-4-propyl fluorene, 9,9-dimethoxymethyl-1,2,3,4-tetrahydro fluorene, 9,9-dimethoxymethyl-1,2,3,4,5,6,7,8-octahydro fluorene, 9,9-dimethoxymethyl-2,3,6,7-diphenylpropylindene, 9,9-dimethoxymethyl-1,8-dichloro fluorene, 7,7-dimethoxymethyl-2,5-dinorbomadiene, 1,4-dimethoxy butane, 2,3-diisopropyl-1,4-dimethoxy butane, 2,3-dibutyl-1,4-dimethoxy butane, 1,2-dimethoxybeneze, 3-ethyl-1,2-dimethoxybeneze, 4-butyl-1,2-dimethoxybeneze, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

According to another embodiment of the catalyst component of the present invention, the weight content of said internal electron donor B in the catalyst component is in a range of 0.01-20%, preferably 1-15%.

According to another aspect of the present invention, provided is a preparation method of the catalyst component as above described, comprising the following steps: contacting at least one magnesium compound and at least one titanium compound with at least one internal electron donor compound, so as to prepare the catalyst component, wherein the internal electron donor compound comprises internal electron donor A, and optionally, internal electron donor B, and internal electron donor A is at least one selected from the compounds as shown in Formula I.

According to the present invention, the internal electron donor compound can include internal electron donor B or not internal electron donor B.

According to the present invention, the magnesium compound is selected from the group consisting of magnesium dihalide, alkoxy magnesium, alkyl magnesium, hydrate or alcohol adduct of magnesium dihalide, or one of the derivatives formed by replacing a halogen atom of the magnesium dihalide molecular formula with an alkoxy or haloalkoxy group, or their mixture. Preferred magnesium compounds are magnesium dihalide, alcohol adduct of magnesium dihalide, and alkoxy magnesium.

According to the present invention, the titanium compound is as shown in Formula of $TiX_n(OR)_{4-n}$, in which R is $C_1$-$C_{20}$ hydrocarbyl group, X is halogen, and n=0-4. For example, it can be titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

According to one embodiment of the method of the present invention, calculated in per mole of magnesium, the adding amount of internal electron donor A is in a range from 0.001 mol to 10 mol (eg. 0.001 mol-10 mol), preferably from 0.001 mol to 5 mol, more preferably from 0.01 mol to 3 mol; and/or the adding amount of internal electron donor B is in a range from 0 mol to 10 mol (eg. 0.001 mol-10 mol), preferably from 0 mol to 5 mol (eg. 0.001 mol-5 mol), more preferably 0.01 mol to 3 mol (eg. 0.02 mol-3 mol).

According to the present invention, the methods for preparing the catalyst component include, but not limited to any one of the following methods.

Method 1: According to another embodiment of the catalyst component of the present invention, the catalyst can be prepared by the method comprising the following steps.

1) A magnesium compound is dissolved in a solvent system comprising an organic epoxy compound, an organic phosphorus compound and an inert diluent. After a uniform solution is formed, the solution is mixed with a titanium compound, and solids are precipitated at the presence of a coprecipitation agent.

2) Such solids are treated with an internal electron donor compound which contains internal electron donor A as shown in Formula I so that said internal electron donor compound is loaded on the solids; optionally, titanium tetrahalide and inert diluent are used to further treat the solids to obtain the catalyst component.

According to one embodiment, the internal electron donor compound can contain internal electron donor compound B in addition to internal electron donor A as shown in Formula I. Said internal electron donor B is at least one selected from the group consisting of esters, ethers, ketones, and amines. Preferably said internal electron donor B is selected from polycarboxylic acid ester compounds, diol ester compounds, and diether compounds. When internal electron donor compound B is used, the solids obtained from step 1) can be firstly treated with internal electron donor compound B, so that said internal electron donor compound is loaded on the solids, and then titanium tetrahalide and inert diluent are used to further treat the solids followed by treating with internal electron donor A, to obtain the catalyst component.

There is no special restriction to the coprecipitation agent used in the method of the present invention, as long as it can precipitate the solid. The coprecipitation agent can be selected from organic acid anhydrides, organic acids, ethers, and ketone, or their mixtures. Examples of the organic acid anhydrides are as follows: acetic anhydride, phthalic anhydride, butanedioic anhydride, and maleic anhydride. Examples of the organic acid are as follows: acetic acid, propionic acid, butyric acid, acrylic acid, and methacrylic acid. Examples of the esters are as follows: dibutyl phthalate, diphen 2,4-pentandiol dibenzoate, 3-ethyl-2,4-pentandiol dibenzoate, 2,3-diisopropyl-1,4-butandiol dibenzoate, 3,5-heptandiol dibenzoate, and 4-ethyl-3,5-heptandiol dibenzoate. Examples of the ethers are as follows: dimethyl ether, diethyl ether, dipropyl ether, dibutyl ether, dipentyl ether, 2-isopropyl-2-isopentyldimethoxy propane, and 9,9-(dimethoxymethyl) fluorene. The ketone can be at least one of acetone, methyl ethyl ketone and benzophenone.

In the present invention, the organic epoxides contain at least one selected group consisting of C2-C8 aliphatic olefins, dialkenes, halogenated aliphatic olefins, oxide of dialkenes, glycidyl ethers and inner ethers. Certain specific compounds are as follows: ethylene oxide, propylene oxide, butylenes oxide, butadiene oxide, butadiene dioxide, epoxy chloropropane, methyl glycidyl ether, diglycidyl ether, tetrahydrofuran, and so on.

In the present invention, the organic phosphorus compound can be hydrocarbyl ester or halogenated hydrocarbyl ester of orthophosphoric acid or phosphorous acid, specifically, such as, trimethyl orthophosphate, triethyl orthophosphate, tributyl orthophosphate, triphenyl orthophosphate, trimethyl phosphite, triethyl phosphite, tributyl phosphite, triphenylmethyl phosphate. Triphenylmethyl phosphate is preferred.

In the present invention, the inert diluents can be at least one selected from $C_6$-$C_{10}$ alkane or aromatic hydrocarbon, preferably from hexane, heptane, octane, decane, benzene, toluene, xylene, or derivatives thereof.

According to one embodiment of the method of the present invention, calculated based on per mole magnesium, the dosage of the organic epoxide is in a range of 0.2 mol-10 mol, the dosage of the organic phosphorus compound is in a range of 0.1 mol-3 mol, the dosage of the titanium compound is in a range of 0.2 mol-50 mol, and the dosage of the coprecipitation agent is in a range of 0 mol-15 mol.

According to one embodiment of the method of the present invention, the recitation, "optionally, titanium tetrahalide and inert diluent are used to further treat the solids" means that a titanium compound and/or inert diluent can be used to treat the solids as required.

According to the present invention, the involved ranges, such as the definition for the groups, contents, or dosages and the like, each contain any specific defined value between the up limit value and the low limit value, and a range between any two values selected from the range between the up limit value and the low limit value.

Method 2: A magnesium halide is dissolved in a uniform solution formed by an organic epoxide and organic phosphorus compound. An inert solvent can also be added, and then an internal electron donor compound is added. The resulting solution is mixed with a titanium compound, kept at a low temperature for a period of time to precipitate the carries. Then the temperature is increased by heating. The mixture is treated with a titanium compound or an inert solvent, filtered, washed, and dried to obtain a solid catalyst comprising titanium, magnesium, halogen and electron donor. The internal electron donor compound comprises internal electron donor A as shown in Formula I.

According to one embodiment, the internal electron donor compound can contain internal electron donor compound B in addition to internal electron donor A as shown in Formula I. Said internal electron donor B is at least one selected from the group consisting of esters, ethers, ketones, and amines. Preferably said internal electron donor B is selected from polycarboxylic acid ester compounds, diol ester compounds, and diether compounds. The dosage of the solvent and the titanium compound is the conventional dosage, and will not be explained herein in detail.

Method 3: The method comprises the following steps.

1) A magnesium compound and an alcohol compound are mixed with an inert solvent. Then a coprecipitation agent is added to obtain an alcohol adduct.

2) The alcohol adduct is contacted with a titanium compound solution at a low temperature, and then solid particles are obtained by separation.

3) The solid particles obtained in step 2) are added to a titanium compound solution, and then solid particles are obtained by separation.

4) The solid particles obtained in step 3) are washed by an inert solvent, and dried to obtain the catalyst component.

In the method, the internal electron donor compound is added in any one of steps 1) to 4). The internal electron donor compound comprises internal electron donor A as shown in Formula I.

According to one embodiment, internal electron donor A as shown in Formula I is added in step 2) and/or 4). For example, the internal electron donor compound is added after the contacting of the alcohol adduct with the titanium compound in step 2), and/or after the separation of the solid in step 3). When the compound as shown in Formula I is added, the treatment temperature is in a range of 60-100° C., preferably 80-100° C., and the treatment time is in a range of 0.5-3 hours, preferably 0.5-2 hours.

According to another embodiment, the internal electron donor compound can contain internal electron donor compound B in addition to internal electron donor A as shown in Formula I. Said internal electron donor B is at least one selected from the group consisting of esters, ethers, ketones, and amines. Preferably said internal electron donor B is selected from polycarboxylic acid ester compounds, diol ester compounds, and diether compounds.

In one embodiment of the above catalyst component, in step 1), preferably, the organic alcohol compound and the magnesium compound (in a molar ratio of 2:1-5:1) are mixed with the inert solvent. After the temperature is increased to 120-150° C., the coprecipitation agent is added in a molar ratio of coprecipitation agent to magnesium of 5:1-50:1. The reaction is carried for 1-5 hours.

In another embodiment of the above catalyst component, the low temperature refers to a temperature below 0° C. Preferably, the alcohol adduct is contacted with the titanium compound solution in a molar ratio of titanium to magnesium of 10:1-50:1 at a low temperature from −15° C. to −40° C. After the temperature is increased to 90-110° C., the internal electron donor compound is added in a molar ratio of magnesium to internal electron donor of 2:1-10:1. The reaction is carried out at 100-130° C. for 1-3 hours, and then the solid particles are obtained by filtration.

In another embodiment of the above catalyst component, preferably, in step 3), the solid particles are added to the titanium compound in a molar ratio of titanium to magnesium with stirring. The reaction is carried out at 100-130° C. for 1-3 hours, and then the solid particles are obtained by filtration.

The inert solvent comprises at least one of $C_1$-$C_{20}$ alkane, cycloalkane, and aromatic hydrocarbon. The dosage of the inert solvent is a conventional dosage in the art.

Method 4: The method comprises the following steps.

1) A magnesium halide alcohol adduct is dispersed in a dispersion system to form an emulsion. The emulsion is discharged into a cooling liquid for chilling, so as to form magnesium chloride alcohol adduct microparticles, which are spherical carriers.

2) A titanium compound is used to treat the above spherical carriers. The temperature is gradually increased. An internal electron donor compound is added before or after the treatment with the titanium compound, to obtain the spherical catalyst component.

In the method, the internal electron donor compound comprises internal electron donor A as shown in Formula I.

According to one embodiment, the internal electron donor compound can contain internal electron donor compound B in addition to internal electron donor A as shown in Formula I. Said internal electron donor B is at least one selected from the group consisting of esters, ethers, ketones, and amines. Preferably said internal electron donor B is selected from polycarboxylic acid ester compounds, diol ester compounds, and diether compounds.

According to one embodiment of the method of the present invention, the magnesium halide alcohol adduct is as shown in $MgX_2 \cdot nROH$, wherein R is $C_1$-$C_4$ alkyl, n is in a range of 1.5-3.5, preferably 2.0-3.0; X is halogen, preferably chloro, bromo, or iodo. The magnesium halide alcohol adduct is prepared by the reaction of magnesium dihalide and an alcohol at a certain temperature. The magnesium halide alcohol adduct has a particle size of 10-300 micrometers, preferably 30-100 micrometers.

According to another embodiment of the method of the present invention, in step 2), preferably, an excess amount of titanium compound is used to treat the above spherical carriers at a low temperature. The molar ratio of the titanium compound to the magnesium halide ranges from 20 to 200, preferably from 30 to 60. The onset treatment temperature is in a range from −30° C. to 0° C., preferably from −25° C. to −20° C. The final treatment temperature is in a range from 80° C. to 136° C., preferably from 100° C. to 130° C.

According to the method of the present invention, the dispersion system uses hydrocarbon inert solvent, such as kerosene, paraffin oil, petrolatum oil, white oil, etc. A surfactant or organosilicon compound can also be added. In one embodiment of the present invention, a combination of white oil and silicone oil is used as the dispersion system. The cooling liquid is an inert hydrocarbon solvent with low point, such as petroleum ether, pentane, hexane, heptane and the like. The inert solvent comprises $C_1$-$C_{20}$ alkane, cycloalkane or aromatic hydrocarbon or a mixture thereof. The dosage of the dispersion system i.e. the cooling liquid is the conventional dosage in the art.

In a specific example, the magnesium alcohol adduct microparticles can be subjected to washing and drying before being treated in step 2). The catalyst component of step 2) can be washed by an inert solvent to obtain a catalyst component with a better effect. The inert solvent can be selected from those commonly used, such as $C_1$-$C_{20}$ alkane, cycloalkane or aromatic hydrocarbon or a mixture thereof.

In specific example, based on the alcohol adduct of magnesium halide, the dosage of the titanium compound is in a range of 1 mol-100 mol, preferably 10 mol-60 mol.

According to the catalyst component of the present invention, when the inert solvent is used for washing, the content of the inert solvent in the catalyst component can be in a range of 1 wt %-15 wt %. The catalyst component has a specific surface greater than 250 m²/g.

Method 5: An alkoxy magnesium or alkoxy magnesium chloride is suspended in an inert solvent to form a suspension, which is then mixed and contacted with a titanium compound to obtain a solid. The solid is then contacted with the internal electron donor comprising the compound as shown in Formula I, so as to obtain a solid catalyst comprising titanium, magnesium, halogen, and electron donor. According to one embodiment, the internal electron donor compound can contain internal electron donor compound B in addition to internal electron donor A as shown in Formula I. Said internal electron donor B is at least one selected from the group consisting of esters, ethers, ketones, and amines. Preferably said internal electron donor B is selected from polycarboxylic acid ester compounds, diol ester compounds, and diether compounds. The alkoxy magnesium is at least one selected from the group consisting of diethyoxyl magnesium, dipropyloxyl magnesium, dihexyloxyl magnesium, dipentyloxy magnesium, and dioctyloxyl magnesium. The alkoxy magnesium chloride is at least one selected from the group consisting of ethyl magnesium chloride, propyl magnesium chloride, pentyl magnesium chloride, hexyl magnesium chloride, heptyl magnesium chloride, and octyl magnesium chloride. The dosage of the inert solvent is conventional.

According to another aspect of the present invention, provided is a catalyst used for propene polymerization, comprising a reactant of the following components:

a). the catalyst component as described above or the catalyst component prepared by the method as described above;

b). an organoaluminium compound; and c). optionally, an organosilicon compound.

According to the catalyst used for propene polymerization of the present invention, the organoaluminium compound as a cocatalyst can be selected from those which can be used as a cocatalyst of Ziegler-Natta catalyst in the filed of propene polymerization. Preferably, the organoaluminium compound is selected from the compounds as show in formula $AlR'_n X_{3-n}$, wherein R' is selected from hydrogen and $C_1$-$C_{20}$ hydrocarbyl; X is halogen, and n is an intergar ranging from 1 to 3.

In the above catalyst, the organoaluminium compound is at least one selected from the following compounds: trimethyl aluminium, triethyl aluminium, triisobutyl aluminium, trioctyl aluminium, diethylaluminium hydride, diisobutyl-aluminium hydride, diethylaluminium chloride, diisobutyl-aluminium chloride, ethyl aluminium sesquichloride, and ethyl aluminium dichloride. Triethyl aluminium and/or triisobutyl aluminium is more preferable.

In the above catalyst, the dosage of the organoaluminium compound can be a conventional dosage in the art. Generally, the molar ratio of organoaluminium compound b) to catalyst component a) is in a range of 20-800:1, calculated based on the ratio of aluminium to titanium.

In the above catalyst, "optionally, an organosilicon compound" means that the catalyst may contain a reactant of components a) and b), or a reactant of components a), b), and c). According to the propene polymerization catalyst of the present invention, the external electron donor component can be a variety of external electron donors known in the art.

In the above catalyst, the external electron donor organosilicon compound is preferably a compound as shown in formula of $R^3_m Si(OR^4)_{4-m}$, wherein, $0 \leq m \leq 3$, $R^3$ and $R^4$ can be alkyl, cycloalkyl, aryl, halogenated alkyl, or amino, independently, and $R^3$ can also be halogen or hydrogen. Preferably, the organosilicon compound is at least one selected from the following organosilicon compounds: trimethylmethoxysilicane, trimethylethoxylsilicane, trimethylphenoxysilicane, dimethyldimethoxysilicane, dimethyldiethyoxylsilicane, cyclohexylmethyldiethyoxylsilicane, methylcyclohexyldimethoxysilicane, diphenyl dimethoxysilicane, diphenyl diethyoxylsilicane, phenyl triethyoxylsilicane, phenyl trimethoxysilicane, and vinyltrimethoxysilicane, preferably selected from cyclohexylmethyldimethoxysilicane and diisopropyldimethoxysilicane. These organosilicon compounds can be used separately or in a combination of two or three compounds.

According to the catalyst for propene polymerization of the present invention, there is no restriction to the dosage of the external electron donor. Preferably, the molar ratio of the organosilicon compound c) to the catalyst component a) is in a range of 0-100:1, based on the molar ratio of silicon to titanium.

According to another aspect of the present invention, provided is a prepolymerization catalyst for propene polymerization, comprising a prepolymer obtained by pre-polymerization of propene with the catalyst component. Preferably, multiple of the pre-polymerization is in a range of 0.1 g-1000 g of propene polymer per 1 g of the catalyst component. Prepolymerization can be performed in gas phase or liquid phase according to the known technique. The steps of prepolymerization as a part of the process of continuous polymerization can be performed on line, and also can be separately performed in batches.

According to another aspect of the present invention, provided is a method for propene polymerization, comprising the step of polymerization of propene which is performed in the presence of the catalyst component as described above, the catalyst as described above, or the pre-polymerization catalyst as described above, wherein said polymerization comprises homopolymerization and copolymerization. The prepolymerization process can be carried out, according to the known technique, in liquid phase or gas phase, or a stage combination thereof. The prepolymerization process can be used not only for propene homopolymerization but also for propene copolymerization.

According to the present invention, when copolymerization is performed, the comonomer is as shown in the formula of $CH_2=CHR$, wherein R is hydrogen or $C_1$-$C_{12}$ hydrocarbyl, preferably hydrogen or $C_1$-$C_6$ alkyl. For example, the comonomer is preferably at least one selected from the group consisting of ethylene, 1-n-butene, 1-n-pentene, 1-n-hexylene, 1-n-octylene, and 4-methyl-1-pentene.

According to the present invention, when the imine compound as shown in Formula I is used as the internal electron donor compound for propene polymerization, it can interact with active component such as titanium and magnesium, to form multi active site. In this manner, the catalyst has a high catalytic activity and a slow rate of delay of activity, and the obtained polymer has a high melt index, wide molecular weight distribution and high isotacticity. According to the present invention, the catalyst has a high catalytic activity, excellent stability and good hydrogen response. The fluidity and processability of the obtained polymer are good. The catalyst component and the catalyst and so on provided by the present invention have a wide application prospect.

DETAILED DESCRIPTION OF THE EMBODIMENTS

The present invention will be explained in detail below in combination with the embodiments. It should be noted that the embodiments are provided for illustrating, rather than restricting the present invention.

Testing Method

1. Isotacticity of the polymer (%): measured by boiling heptane extraction.
2. Melt index of the polymer (g/10 min): measured based on ASTMD1238-99 standard.
3. Molecular weight distribution of polymer (Mw/Mn): measured by a gel permeation chromatograph manufactured by Waters company, with 1,2,4-trichlorobenzene as solvent, and styrene as standard sample.
4. Nuclear magnetic resonance (NMR) analysis about the polymer: H-NMR of the polymer is measured by using a Bruke dmx 300 MHz NMR spectrometer at a temperature of 275 K, with deuterated chloroform as solvent, TMS as internal standard.

Specific synthesis of some of imine compounds is provided in the following text as examples.

I. Synthesis of Compounds

Compound 1

1.9 g of 2,2-diphenylacetaldehyde and 100 mL of isopropanol were placed into a three-neck flask. 2,6-diisopropylaniline (1.92 g) and 0.1 mL of glacial acetic acid were added into the mixture with stirring. The resulting mixture was stirred and reacted at room temperature for 2 hours, and then heated to perform a reflux reaction for 24 hours. After cooling, a solid was precipitated, which was then recrystallized by using a mixed solvent of diethyl ether and ethanol, to obtain a product 2,6-diisopropyl-N-(2,2-diphenylethylidene)aniline (1.52 g; the yield was 71%). $^1$H-NMR ($\delta$, ppm, TMS, CDCl$_3$): 7.86-7.55 (10H, m, ArH), 7.42 (1H, s, CH=N), 7.12-7.28 (3H, ArH), 4.46 (1H, m, CH), 3.20-3.36 (2H, m, CH), 1.23-1.36 (6H, d, CH$_3$), 0.98-1.20 (6H, d, CH$_3$); mass spectrum, FD-mass spectrometry: 355.

Compound 2

1.2 g of phenylacetaldehyde and 80 mL of methanol were placed into a three-neck flask. 2,6-diisopropyl aniline (1.93 g) and 0.1 mL of glacial acetic acid were added into the mixture with stirring. The resulting mixture was stirred and reacted at room temperature for 4 hours, and then heated to perform a reflux reaction for 32 hours, followed by cooling to room temperature. The solvent was removed. The primary product was purified by using a silica gel column, with ethyl acetate/petroleum ether (1:50) as an eluant, to obtain a product 2,6-diisopropyl-N-(2-phenylethylidene) aniline (2.12 g; the yield was 76%). $^1$H-NMR ($\delta$, ppm, TMS, CDCl$_3$): 7.76-7.55 (5H, m, ArH), 7.46 (1H, s, CH=N), 7.12-7.28 (3H, ArH), 4.16 (2H, s, CH$_2$), 3.42-3.65 (2H, m, CH), 1.23-1.36 (6H, d, CH$_3$), 0.98-1.20 (6H, d, CH$_3$); mass spectrum, FD-mass spectrometry: 279.

Compound 3

1.2 g of phenylacetaldehyde and 80 mL of ethanol were placed into a three-neck flask. 8-aminoquinoline (1.44 g) and 0.1 mL of glacial acetic acid were added into the mixture with stirring. The resulting mixture was stirred and reacted at room temperature for 2 hours, and then heated to perform a reflux reaction for 30 hours, followed by cooling to room temperature. The solvent was removed. The primary product was separated and purified by using a silica gel column, with ethyl acetate/petroleum ether (1:30) as an eluant, to obtain a product N-(2-phenylethylidene)-8-aminoquinoline (2.08 g; the yield was 85%). $^1$H-NMR ($\delta$, ppm, TMS, CDCl$_3$): 8.60-8.86 (1H, m, ArH), 7.96-7; 65 (5H, m, ArH), 7.60-7.56 (5H, m, ArH), 7.46 (1H, m, CH=N), 2.86 (2H, m, CH$_2$); mass spectrum, FD-mass spectrometry: 246.

Compound 4

1.9 g of 2,2-diphenylacetaldehyde, 0.1 mL of glacial acetic acid, and 80 mL of isopropanol were placed into a three-neck flask. A mixed solution of 2,6-dimethylaniline (1.33 g) and 10 mL of isopropanol was added into the mixture with stirring. The resulting mixture was stirred and reacted at room temperature for 1 hour, and then heated to perform a reflux reaction for 24 hours, followed by removing the solvent. The primary product was purified by using a silica gel column, with ethyl acetate/petroleum ether (1:30) as an eluant, to obtain a product 2,6-dimethyl-N-(2,2-diphenylethylidene) aniline of 1.82 g (the yield was 64%). $^1$H-NMR ($\delta$, ppm, TMS, CDCl$_3$): 7.86-7.55 (10H, m, ArH), 7.42 (1H, s, CH=N), 7.12-7.28 (3H, ArH), 4.46 (1H, m, CH), 2.42-2.65 (6H, s, CH$_3$); mass spectrum, FD-mass spectrometry: 299.

Compound 5 Synthesis of Compound 2-(4-quinolylimino)methyl-4,6-di-tert-butylphenol 2.34 g of 3,5-di-tert-butylsalicylaldehyde and 70 mL of ethanol were placed into a reaction flask. 1.44 g of 4-aminoquinoline and 0.1 mL of glacial acetic acid were added into the mixture with stirring. The resulting mixture was stirred and reacted for 0.5 hour, and then heated to 100° C. to perform a reflux reaction for 24 hours, followed by removing the solvent. The primary product was purified by using a silica gel column, with ethyl acetate/petroleum ether (1:30) as an eluant, to obtain a product [2-(4-quinolylimino)methyl-4,6-di-tert-butylphenol] of 2.5 g. The yield was 70%. $^1$H-NMR ($\delta$, ppm, TMS, CDCl$_3$): 8.60-8.76 (2H, m, CH=N), 7.96-7.65 (4H, m, ArH), 7.60-7.36 (3H, m, ArH), 3.73 (1H, s, OH), 1.30-1.54 (18H, m, CH$_3$); mass spectrum, FD-mass spectrometry: 360.

Compound 6 Synthesis of Compound 2-(8-quinolylimino)methyl-4,6-di-tert-butylphenol 2.34 g of 3,5-di-tert-butylsalicylaldehyde and 70 mL of ethanol were placed into a reaction flask. 1.44 g of 8-aminoquinoline and 0.1 mL of glacial acetic acid were added into the mixture with stirring. The resulting mixture was stirred and reacted for 1 hour, and then heated to 100° C. to perform a reflux reaction for 24 hours, followed by removing the solvent. The primary product was purified by using a silica gel column, with ethyl acetate/petroleum ether (1:30) as an eluant, to obtain a product [2-(8-quinolylimino)methyl-4,6-di-tert-butylphenol] of 2.8 g. The yield was 80%. $^1$H-NMR ($\delta$, ppm, TMS, CDCl$_3$): 8.60-8.76 (2H, m, CH=N), 7.96-7.65 (4H, m, ArH), 7.60-7.36 (3H, m, ArH), 3.74 (1H, s, OH), 1.30-1.54 (18H, m, CH$_3$); mass spectrum, FD-mass spectrometry: 360.

Compound 7 Synthesis of Compound 2-(hexylimino)methyl-4,6-di-tert-butylphenol 2.34 g of 3,5-di-tert-butylsalicylaldehyde and 70 mL of isopropanol were placed into a reaction flask. 1-hexyl amine (1.01 g) and 0.1 mL of glacial acetic acid were added into the mixture with stirring. The resulting mixture was stirred and reacted for 0.5 hour, and then heated to 100° C. to perform a reflux reaction for 20 hours, followed by removing the solvent. The primary product was purified by using a silica gel column, with ethyl acetate/petroleum ether (1:30) as an eluant, to obtain a product [2-(hexylimino)methyl-4,6-di-tert-butylphenol] of 2.7 g. The yield was 67.7%. $^1$H-NMR (δ, ppm, TMS, CDCl$_3$): 8.60-8.76 (1H, m, CH=N), 7.64-7.36 (2H, m, ArH), 3.74 (11H, s, OH), 2.78 (2H, m, =NCH$_2$), 1.33-1.54 (18H, m, CH$_3$), 1.25-1.31 (8H, m, CH$_2$), 0.89-1.08 (3H, t, CH$_3$); mass spectrum, FD-mass spectrometry: 317.

Compound 8 Synthesis of Compound
N-(1-naphthylmethylene)-2,6-diisopropyl aniline 1.56 g of 1-naphthoic aldehyde and 80 mL of isopropanol were placed into a reaction flask. 2,6-diisopropylphenylimine (1.78 g) and 0.1 mL of glacial acetic acid were added into the mixture with stirring. The resulting mixture was stirred and reacted for 0.5 hour, and then heated to perform a reflux reaction for 24 hours, followed by removing the solvent. The primary product was purified by using a silica gel column, with ethyl acetate/petroleum ether (1:30) as an eluant, to obtain a product [N-(1-naphthylmethylene)-2,6-diisopropyl aniline] (2.14 g; the yield was 68%). 1H-NMR (δ, ppm, TMS, CDCl3): 8.60-8.76 (1H, m, CH=N), 7.86-8.02 (2H, m, ArH), 7.64-7.36 (5H, m, ArH), 7.08-7.28 (3H, m, ArH), 3.16-3.34 (2H, s, CH), 1.32-1.52 (6H, m, CH$_3$), 1.23-1.32 (6H, m, CH$_3$); mass spectrum, FD-mass spectrometry: 315.

II. Preparation of Catalyst Component and Polymerization of Propylene

Group I

EXAMPLES AND COMPARATIVE EXAMPLES

Example 1

(1) Preparation of a Solid Catalyst Component
(Namely Catalyst Component)

4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with TiCl$_4$ within 1 hour, and slowly heated to 80° C. to gradually precipitate the solid. Then, DNBP (di-n-butyl phthalate; 0.003 mol) and 2,6-diisopropyl-N-butylidene aniline of the Formula I (0.003 mol) were added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., washed for three times with each time lasting for 10 minutes, again added with 60 mL of hexane, and washed twice to obtain a solid (catalyst component) of 7.9 g, containing 3.3% Ti, 23.6% Mg and 50.4% Cl.

(2) Polymerization of Propylene 2.5 mL of AlEt$_3$, and 5 mL of cyclohexyl methyl dimethoxy silane (CHMMS) enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 1 for specific data.

Example 2

Steps of example 2 were the same as those of example 1, except that the compound 2,6-diisopropyl-N-butylidene aniline was substituted with 2,6-diisopropyl-N-(2-phenylethylidene)aniline. The catalyst component prepared in the present example was used for polymerization. See Table 1 for specific data.

Example 3

Steps of example 3 were the same as those of example 1, except that the compound 2,6-diisopropyl-N-butylidene aniline was substituted with 2,6-dimethyl-N-(2,2-diphenylethylidene) aniline. The catalyst component prepared in the present example was used for polymerization. See Table 1 for specific data.

Example 4

Steps of example 4 were the same as those of example 1, except that the compound 2,6-diisopropyl-N-butylidene aniline was substituted with N-(2-phenylethylidene)-8-aminoquinoline. The catalyst component prepared in the present example was used for polymerization. See Table 1 for specific data.

Example 5

Steps of example 5 were the same as those of example 1, except that the compound 2,6-diisopropyl-N-butylidene aniline was substituted with 2,6-dimethyl-N-butylidene aniline. The catalyst component prepared in the present example was used for polymerization. See Table 1 for specific data.

Example 6

Steps of example 6 were the same as those of example 1, except that the compound 2,6-diisopropyl-N-butylidene aniline was substituted with 2,6-diisopropyl-N-(2,2-diphenylethylidene) aniline. The catalyst component prepared in the present example was used for polymerization. See Table 1 for specific data.

Example 7

Steps of example 7 were the same as those of example 1, except that the compound DNBP was substituted with 2-isopropyl-2-isopentyl-1,3-dimethoxypropane. The catalyst component prepared in the present example was used for polymerization. See Table 1 for specific data.

Example 8

Steps of example 8 were the same as those of example 1, except that the compound DNBP was substituted with diethyl 2,3-dibutylsuccinate. The catalyst component prepared in the present example was used for polymerization. See Table 1 for specific data.

Example 9

Steps of example 9 were the same as those of example 1, except that the compound DNBP was substituted with 3,5-dibenzoyloxyheptane. The catalyst component prepared in the present example was used for polymerization. See Table 1 for specific data.

Example 10

Steps of example 10 were the same as those of example 1, except that the amount of the added compound 2,6-diisopropyl-N-butylidene aniline was changed to 0.006 mol. The catalyst component prepared in the present example was used for polymerization. See Table 1 for specific data.

Example 11

Steps of example 11 were the same as those of example 1, except that the amount of the added compound 2,6-diisopropyl-N-butylidene aniline was changed to 0.0015 mol. The catalyst component prepared in the present example was used for polymerization. See Table 1 for specific data.

Example 12

Steps of example 12 were the same as those of example 1, except that the time of the polymerization reaction was extended to 2 hours. See Table 1 for specific data.

Example 13

Steps of example 13 were the same as those of example 1, except that the time of the polymerization reaction was extended to 3 hours. See Table 1 for specific data.

Example 14

Steps of example 14 were the same as those of example 5, except that the time of the polymerization reaction was extended to 2 hours. See Table 1 for specific data.

Example 15

Steps of example 15 were the same as those of example 5, except that the time of the polymerization reaction was extended to 3 hours. See Table 1 for specific data.

Example 16

Steps of example 16 were the same as those of example 1, except that the amount of the added hydrogen gas was changed to 7.2 NL. See Table 1 for specific data.

Comparative Example 1

Steps of comparative example 1 were the same as those of example 1, except that the no 2,6-diisopropyl-N-butylidene aniline was added, and that the amount of the added DNBP was 0.006 mol. See Table 1 for specific data.

Comparative Example 2

Steps of comparative example 2 were the same as those of comparative example 1, except that DNBP was substituted with 2-isopropyl-2-isopentyl-1,3-dimethoxypropane (0.006 mol). See Table 1 for specific data.

Comparative Example 3

Steps of comparative example 3 were the same as those of comparative example 1, except that the amount of the added hydrogen was changed from 1.2 NL to 7.2 NL. See Table 1 for specific data.

TABLE 1

| | Catalyst Activity (Kg polymer/ g catalyst) | Polymer Isotacticity (%) | Melt Index M.I (g/10 min) | $M_w/M_n$ |
|---|---|---|---|---|
| Example 1 | 36.5 | 97.1 | 3.0 | 6.9 |
| Example 2 | 41.6 | 97.2 | 3.2 | 7.0 |
| Example 3 | 40.5 | 97.3 | 3.3 | 7.1 |
| Example 4 | 40.2 | 97.0 | 3.3 | 7.0 |
| Example 5 | 41.9 | 97.3 | 3.1 | 7.0 |
| Example 6 | 40.3 | 97.1 | 3.3 | 7.2 |
| Comparative Example 1 | 32.5 | 98.0 | 1.2 | 3.8 |
| Example 8 | 39.6 | 97.6 | 2.5 | 6.3 |
| Example 10 | 38.8 | 96.6 | 3.7 | 7.8 |
| Example 11 | 34.3 | 97.7 | 2.1 | 5.8 |
| Example 12 | 64.6 | 97.6 | 2.7 | 6.4 |
| Example 13 | 85.3 | 97.7 | 3.0 | 7.0 |
| Example 14 | 68.2 | 97.8 | 2.0 | 6.2 |
| Example 15 | 89.2 | 97.6 | 1.7 | — |
| Example 16 | 53.2 | 95.4 | 36.5 | 7.5 |
| Comparative Example 3 | 43.8 | 96.3 | 28.6 | — |
| Example 9 | 48.5 | 97.2 | 3.5 | 7.4 |
| Example 7 | 40.2 | 97.4 | 2.7 | 6.4 |
| Comparative Example 2 | 39.3 | 97.8 | 7.2 | 5.5 |

As can be seen from Table 1, the catalyst provided by the present invention can widen the molecular weight distribution of the obtained polymer. Meanwhile, the catalyst has a relatively high catalytic activity and a good orientation ability, and the polymer obtained has a high isotacticity. This means that the polymer has a good mechanic property and processability. It can be seen from examples 12 to 15 that the catalyst provided by the present invention decreases slowly in activity, and has a relatively high long-term stability. It can be seen from example 16 and comparative example 3 that the catalyst provided by the present invention also has a good hydrogen response. Besides, specifically, with the amounts of internal electron donors being the same, compared with the use of only dicarboxylic ester (e.g., in comparative example 1), the use of the imine compound used in the present invention together with the dicarboxylic ester (examples 1 to 6) can not only greatly improve the activity and isotacticity of the polymerization, but also enable the polymer to have a higher isotacticity and melt index. With the amounts of internal electron donors being the same, compared with the use of only diether (e.g., in comparative example 2), the use of the imine compound used in the present invention together with the diether (example 7) can widen the molecular weight distribution of the polymer and increase catalytic activity. Meanwhile, the catalyst still has a good orientation ability, and the polymer obtained has a relatively high isotacticity.

Group II

Examples and Comparative Examples

Example 1

(1) Preparation of a Solid Catalyst Component 36.5 mL of anhydrous ethanol and 21.3 g of anhydrous magnesium chloride were placed into a 250 mL reactor provided therein with a reflux condenser, a mechanical agitator, and a thermometer, and fully replaced by nitrogen. The mixture was stirred and heated to lead to a complete dissolution of magnesium chloride, then added with 75 mL of white oil and 75 mL of silicone oil, and kept at 120° C. for a certain time. 112.5 mL of white oil and 112.5 mL of silicone oil were added in advance in a second 500 mL reactor provided therein with a homogenizer, and preheated to 120° C. The previous mixture was pressed rapidly into the second reactor. The resulting mixture in the second reactor was kept at 120° C. and stirred at a speed of 3500 rmp for 3 minutes, and was transferred to a third reactor while being stirred. The third rector was added with 1600 mL of hexane in advance and was cooled to −25° C. Until finishing transfer of the mixture into the third reactor, the mixture had an ultimate temperature not higher than 0° C. The resulting mixture was subjected to suction filtration, and was washed with hexane and dried in vacuum to obtain spheric particles of an alcohol adduct of magnesium chloride of 41 g. After the obtained particles were screened, carriers (100-400 mesh) were taken for analysis. The analysis showed that the component of the carriers was $MgCl_2.2.38C_2H_5OH$.

7 g of the above $MgCl_2.2.38C_2H_5OH$ spheric carriers was measured and added 5 slowly into a reactor which was provided therein in advance with 100 mL of titanium tetrachloride and pre-cooled to −20° C. The resulting mixture in the reactor were heated gradually to 40° C., followed by addition of 2,4-dibenzoyloxypentane (0.003 mol) and a compound 2,6-diisopropylbutylidene aniline (0.003 mol) of the Formula IV. The resulting mixture was heated continuously to 100° C. in 1 hour, kept for 2 hours, and then subjected to suction filtration. The mixture was again added with 100 mL of $TiCl_4$, then heated to 120° C. in 1 hour, kept for 2 hours, and subjected to suction filtration. After that, the mixture was washed with 60 mL of hexane for several times until the filtrate contained no chloridion. The filter cake was dried in vacuum to obtain a solid catalyst component.

(2) Polymerization of Propylene 2.5 mL of $AlEt_3$, and 0.1 mmol of cyclohexyl methyl dimethoxy silane (CHMMS) were placed into a stainless reactor having a volume of 5 L and replaced by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure releasing, so that a PP powder could be obtained. See Table 2 for specific polymerization data.

Example 2

The steps of the present example were the same as those of example 1 of the present group, except that the amount of the added compound 2,6-diisopropyl-N-butylidene aniline was changed into 6 mmol. See Table 2 for specific data.

Example 3

The steps of the present example were the same as those of example 1 of the present group, except that the amount of the added compound 2,6-diisopropyl-N-butylidene aniline was changed into 1.5 mmol. See Table 2 for specific data.

Example 4

The steps of the present example were the same as those of example 1 of the present group, except that the compound 2,6-diisopropyl-N-butylidene aniline was substituted with 2,6-diisopropyl-N-(2-phenylethylidene) aniline. See Table 2 for specific data.

Example 5

The steps of the present example were the same as those of example 1 of the present group, except that the compound 2,6-diisopropyl-N-butylidene aniline was substituted with 2,6-dimethyl-N-(2,2-diphenylethylidene) aniline. See Table 2 for specific data.

Example 6

The steps of the present example were the same as those of example 1 of the present group, except that the compound 2,6-diisopropyl-N-butylidene aniline was substituted with N-(2-phenylethylidene)-8-aminoquinoline. See Table 2 for specific data.

Example 7

The steps of the present example were the same as those of example 1 of the present group, except that the compound 2,6-diisopropyl-N-butylidene aniline was substituted with 2,6-dimethyl-N-butylidene aniline. See Table 2 for specific polymerization data.

Example 8

The steps of the present example were the same as those of example 1 of the present group, except that the compound 2,6-diisopropyl-N-butylidene aniline was substituted with 2,6-diisopropyl-N-(2,2-diphenylethylidene) aniline. See Table 2 for specific data.

Example 9

The steps of the present example were the same as those of example 1 of the present group, except that the compound 2,4-dibenzoyloxy pentane was substituted with 3,5-dibenzoyloxy heptane. See Table 2 for specific data.

Example 10

The steps of the present example were the same as those of example 1 of the present group, except that the compound 2,4-dibenzoyloxy pentane was substituted with 2-isopropyl-2-isopentyl-1,3-dimethoxypropane. See Table 2 for specific polymerization data.

Example 11

The steps of the present example were the same as those of example 1 of the present group, except that the compound 2,4-dibenzoyloxy pentane was substituted with diethyl 2,3-dibutylsuccinate. See Table 2 for specific data.

Example 12

The steps of the present example were the same as those of example 1 of the present group, except that the compound 2,4-dibenzoyloxy pentane was substituted with di-n-butyl phthalate (DNBP). See Table 2 for specific data.

Example 13

(1) Preparation of a Solid Catalyst Component 36.5 mL of anhydrous ethanol and 21.3 g of anhydrous magnesium chloride were placed into a 250 mL reactor provided therein with a reflux condenser, a mechanical agitator, and a thermometer, and replaced by nitrogen gas. The mixture was stirred and heated to lead to a complete dissolution of magnesium chloride, then added with 75 mL of white oil and 75 mL of silicone oil, and kept at 120° C. for a certain time. 112.5 mL of white oil and 112.5 mL of silicone oil were added in advance in a second 500 mL reactor provided therein with a homogenizer, and preheated to 120° C. The previous mixture was pressed rapidly into the second reactor. The resulting mixture in the second reactor was kept at 120° C. and stirred at a speed of 3500 rmp for 3 minutes, and was transferred to a third reactor while being stirred. The third rector was added with 1600 mL of hexane in advance and was cooled to −25° C. Until finishing transfer of the mixture into the third reactor, the mixture had an ultimate temperature not higher than 0° C. The resulting mixture was subjected to suction filtration, and was washed with hexane and dried in vacuum to obtain spheric particles of an alcohol adduct of magnesium chloride of 41 g. After the obtained particles were screened, carriers (100-400 mesh) were taken for analysis. The analysis showed that the component of the carriers was $MgCl_2 \cdot 2.38C_2H_5OH$.

7 g of the above $MgCl_2 \cdot 2.38C_2H_5OH$ spheric carriers was measured and added slowly into a reactor which was provided therein in advance with 100 mL of titanium tetrachloride and pre-cooled to −20° C. The resulting mixture in the reactor was heated gradually to 40° C., followed by addition of 2,4-dibenzoyloxypentane (0.006 mol). The resulting mixture was heated continuously to 100° C. in 1 hour, kept for 2 hours, and then subjected to suction filtration. The mixture was again added with 100 mL of $TiCl_4$, then heated to 120° C. in 1 hour, kept for 2 hours, and subjected to suction filtration. After that, the mixture was added with 60 mL of hexane and the compound 2,6-diisopropyl-N-butylidene aniline of said structure (0.006 mol), and stirred for 30 minutes. The resulting mixture was washed with 60 mL of hexane for several times until the filtrate contained no chloridion. The filter cake was dried in vacuum to obtain a solid catalyst component.

(2) Polymerization of Propylene 2.5 mL of $AlEt_3$, and 0.1 mmol of cyclohexyl methyl dimethoxy silane (CHMMS) were placed into a stainless reactor having a volume of 5 L and replaced by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure releasing, so that a PP powder could be obtained. See Table 2 for specific polymerization data.

Example 14

The steps of the present example were the same as those of example 1 of the present group, except that the time of the polymerization reaction was extend to 2 hours. See Table 2 for the results.

Example 15

The steps of the present example were the same as those of example 1 of the present group, except that the time of the polymerization reaction was extend to 3 hours. See Table 2 for the results.

Example 16

The steps of the present example were the same as those of example 7 of the present group, except that the time of the polymerization reaction was extend to 2 hours. See Table 2 for the results.

Example 17

The steps of the present example were the same as those of example 7 of the present group, except that the time of the polymerization reaction was extend to 3 hours. See Table 2 for the results.

Example 18

The steps of the present example were the same as those of example 1 of the present group, except that the amount of the added hydrogen gas was changed to 7.2 NL. See Table 2 for the results.

Comparative Example 1

Steps of comparative example 1 were the same as those of example 1 of the present group, except that the no imine compound (2,6-diisopropyl-N-butylidene aniline) was added, and that the amount of the added 2,4-dibenzoyloxy pentane was 0.006 mol. See Table 2 for specific polymerization data.

TABLE 2

| | Catalyst Activity (Kg polymer/ g catalyst) | Polymer Isotacticity (%) | Melt Index M.I (g/10 min) | Mw/Mn |
|---|---|---|---|---|
| Example 1 | 48.0 | 97.7 | 3.0 | 8.3 |
| Example 2 | 40.6 | 97.4 | 3.7 | 8.9 |
| Example 3 | 43.2 | 97.5 | 3.0 | 7.9 |
| Example 4 | 39.7 | 97.2 | 3.1 | 8.0 |
| Example 5 | 46.5 | 97.6 | 3.3 | 8.7 |
| Example 6 | 45.2 | 97.6 | 3.4 | 8.9 |
| Example 7 | 43.9 | 97.7 | 3.1 | 8.4 |
| Example 8 | 50.3 | 97.4 | 3.3 | 8.7 |
| Comparative Example 1 | 46.6 | 96.5 | 3.6 | 6.9 |
| Example 9 | 48.7 | 96.5 | 4.6 | 8.9 |
| Example 10 | 37.2 | 97.4 | 6.6 | 7.0 |
| Example 11 | 39.6 | 97.6 | 3.5 | 8.8 |
| Example 12 | 38.5 | 97.8 | 3.1 | 7.9 |
| Example 13 | 40.7 | 97.7 | 3.1 | 8.5 |
| Example 14 | 65.6 | 97.7 | 3.1 | — |
| Example 15 | 87.3 | 97.7 | 3.0 | — |
| Example 16 | 68.7 | 97.8 | 3.2 | — |

TABLE 2-continued

| | Catalyst Activity (Kg polymer/ g catalyst) | Polymer Isotacticity (%) | Melt Index M.I (g/10 min) | Mw/Mn |
|---|---|---|---|---|
| Example 17 | 91.2 | 97.6 | 3.0 | — |
| Example 18 | 59.2 | 95.4 | 46.5 | — |

As can be seen from Table 2, the catalyst provided by the present invention can widen the molecular weight distribution of the obtained polymer. Meanwhile, the obtained catalyst has a high catalytic activity and a good orientation ability, and the polymer obtained has a high isotacticity and a suitable melt index. This means that the polymer has a good mechanic property, flowing property, and processability. Besides, it can be seen from examples 14 to 17 that the obtained catalyst decreases slowly in activity, and has a higher long-term stability. It can be seen from example 18 that the catalyst provided by the present invention also has a good hydrogen response. Specifically, with the amounts of internal electron donors being the same, compared with the use of only one internal electron donor (in comparative example), the use of the imine compound used in the present invention together with the one internal electron donor (examples 1 to 8) can not only cause the polymer to have a higher isotacticity and a wider molecular weight distribution, but also enable the catalyst to have a higher catalytic activity and a better orientation capability.

Group III

Examples and Comparative Examples

Example 1

Under a nitrogen atmosphere, 4.8 g of anhydrous magnesium chloride, 19.5 g of isooctanol, and 19.5 g of decane were placed into a 500 mL reactor provided therein with an agitator, then heated to 130° C. to react for 1.5 hours until a complete dissolution of magnesium chloride. After an addition of 1.1 g phthalic anhydride, the mixture was kept at 130° C. to react for 1 hour to obtain an alcohol adduct of magnesium chloride, which was then cooled to room temperature. Under a nitrogen atmosphere, the above alcohol adduct was added into 120 mL of titanium tetrachloride solution which was precooled to −22° C. The resulting mixture was heated slowly to 100° C., and added with DNBP (di-n-butyl phthalate; 0.003 mol) and a compound 2,6-diisopropyl-N-butylidene aniline (0.003 mol). The mixture was heated and kept at 110° C. for 2 hours, followed by an immediate filtration. The mixture was then added with 120 mL of titanium tetrachloride solution, heated to 110° C. to react for 1 hour, and filtered. The resulting mixture was added with 80 mL of methylbenzene, 2.66 g of tributyl phosphate, and kept at 90° C. for 0.5 hour. Solid particles were washed with anhydrous hexane for four times, and dried to obtain a solid catalyst component.

2.5 mL of AlEt$_3$, and 0.1 mmol of cyclohexyl methyl dimethoxy silane (CHMMS) were placed into a stainless reactor having a volume of 5 L and replaced by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure releasing, so that a PP powder could be obtained. See Table 3 for specific polymerization data.

Example 2

The steps of the present example were the same as those of example 1 of the present group, except that the compound 2,6-diisopropyl-N-butylidene aniline was substituted with 2,6-diisopropyl-N-(2-phenylethylidene) aniline. See Table 3 for specific data.

Example 3

The steps of the present example were the same as those of example 1 of the present group, except that the compound 2,6-diisopropyl-N-butylidene aniline was substituted with 2,6-dimethyl-N-(2,2-diphenylethylidene) aniline. See Table 3 for specific data.

Example 4

The steps of the present example were the same as those of example 1 of the present group, except that the compound 2,6-diisopropyl-N-butylidene aniline was substituted with N-(2-phenylethylidene)-8-aminoquinoline. See Table 3 for specific data.

Example 5

The steps of the present example were the same as those of example 1 of the present group, except that the compound 2,6-diisopropyl-N-butylidene aniline was substituted with 2,6-dimethyl-N-butylidene aniline. See Table 3 for specific data.

Example 6

The steps of the present example were the same as those of example 1 of the present group, except that the compound 2,6-diisopropyl-N-butylidene aniline was substituted with 2,6-diisopropyl-N-(2,2-diphenylethylidene) aniline. See Table 3 for specific data.

Example 9

The steps of the present example were the same as those of example 1 of the present group, except that the compound DNBP was substituted with 2,4-dibenzoyloxy pentane. See Table 3 for specific data.

Example 10

The steps of the present example were the same as those of example 1 of the present group, except that the compound DNBP was substituted with 2-isopropyl-2-isopentyl-1,3-dimethoxy propane. See Table 3 for specific data.

Example 11

The steps of the present example were the same as those of example 1 of the present group, except that the compound DNBP was substituted with diethyl 2,3-dibutyl succinate. See Table 3 for specific data.

Example 12

The steps of the present example were the same as those of example 1 of the present group, except that the compound DNBP was substituted with 3,5-benzoyloxy heptane. See Table 3 for specific data.

Example 13

Under a nitrogen atmosphere, 4.8 g of anhydrous magnesium chloride, 19.5 g of isooctanol, and 19.5 g of decane were placed into a 500 mL reactor provided therein with an agitator, then heated to 130° C. to react for 1.5 hours until a complete dissolution of magnesium chloride. After an addition of 1.1 g phthalic anhydride, the mixture was kept at 130° C. to react for 1 hour to obtain an alcohol adduct of magnesium chloride, which was then cooled to room temperature. Under a nitrogen atmosphere, the above alcohol adduct was added into 120 mL of titanium tetrachloride solution which was precooled to −22° C. The resulting mixture was heated slowly to 100° C., and added with 2,4-dibenzoyloxypentane (0.006 mol). The mixture was heated and kept at 110° C. for 2 hours, followed by an immediate filtration. The mixture was again added with 120 mL of titanium tetrachloride solution, heated to 110° C. to react for 1 hour, and filtered. The resulting mixture was added with 80 mL of methylbenzene, and a compound 2,6-diisopropyl-N-butylidene aniline (0.006 mol) with said structure, and kept at 90° C. for 0.5 hour. Solid particles were washed with anhydrous hexane for four times, and dried to obtain a solid catalyst component.

2.5 mL of AlEt$_3$, and 0.1 mmol of cyclohexyl methyl dimethoxy silane (CHMMS) were placed into a stainless reactor having a volume of 5 L and replaced by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure releasing, so that a PP powder could be obtained. See Table 3 for specific polymerization data.

Example 14

The steps of the present example were the same as those of example 1 of the present group, except that the time of the polymerization reaction was extend to 2 hours. See Table 3 for the results.

Example 15

The steps of the present example were the same as those of example 1 of the present group, except that the time of the polymerization reaction was extend to 3 hours. See Table 3 for the results.

Example 16

The steps of the present example were the same as those of example 5 of the present group, except that the time of the polymerization reaction was extend to 2 hours. See Table 3 for the results.

Example 17

The steps of the present example were the same as those of example 5 of the present group, except that the time of the polymerization reaction was extend to 3 hours. See Table 3 for the results.

Example 18

The steps of the present example were the same as those of example 1 of the present group, except that the amount of the added hydrogen gas was changed to 7.2 NL. See Table 3 for the results.

Comparative Example 1

Steps of comparative example 1 were the same as those of example 1 of the present group, except that the no 2,6-diisopropyl-N-butylidene aniline was added, and that the amount of the added DNBP was 0.006 mol. See Table 3 for specific polymerization data.

TABLE 3

| | Catalyst Activity (Kg polymer/ g catalyst) | Polymer Isotacticity (%) | Melt Index M.I (g/10 min) | $M_w/M_n$ |
|---|---|---|---|---|
| Example 1 | 37.6 | 97.2 | 3.1 | 7.0 |
| Example 2 | 42.7 | 97.3 | 3.2 | 7.2 |
| Example 3 | 41.4 | 97.3 | 3.3 | 7.5 |
| Example 4 | 40.8 | 97.1 | 3.4 | 7.8 |
| Example 5 | 40.9 | 97.5 | 3.1 | 7.1 |
| Example 6 | 41.0 | 97.2 | 3.3 | 7.5 |
| Comparative Example 1 | 45.1 | 96.7 | 3.0 | 5.6 |
| Example 7 | 39.8 | 97.4 | 3.9 | 8.0 |
| Example 8 | 37.0 | 97.1 | 3.1 | 6.6 |
| Example 9 | 42.3 | 97.7 | 3.8 | 7.8 |
| Example 10 | 41.5 | 97.5 | 6.2 | 6.5 |
| Example 11 | 39.8 | 97.7 | 3.5 | 8.4 |
| Example 12 | 38.8 | 97.3 | 3.5 | 8.0 |
| Example 13 | 43.0 | 97.7 | 3.1 | 8.1 |
| Example 14 | 65.2 | 97.7 | 3.7 | nd |
| Example 15 | 88.1 | 97.8 | 3.0 | nd |
| Example 16 | 72.4 | 97.8 | 3.1 | nd |
| Example 17 | 91.2 | 97.7 | 3.1 | nd |
| Example 18 | 53.2 | 95.4 | 41.0 | nd |

As can be seen from Table 3, the catalyst provided by the present invention can widen the molecular weight distribution, improve isotacticity, and has a good orientation ability. Meanwhile, the obtained catalyst has a high catalytic activity, and the polymer obtained has a relatively high melt index. This means that the polymer has a good mechanic property, flowing property, and processability. Specifically, compared with the use of only one compound B (e.g., dicarboxylic ester compound as internal electron donor in comparative example 1) as the internal electron donor, the use of the compound of Formula I of the present invention and the compound B (examples 1 to 6) as internal electron donors can widen the molecular weight distribution, and improve the isotacticity of the polymer and the orientation ability of the catalyst. Meanwhile, the catalyst provided by the present invention also has a high catalytic activity, and the obtained polymer has a high melt index. Besides, it can be seen from examples 14 to 17 that the obtained catalyst decreases more slowly in activity, and hence has a higher long-term stability. It can be seen from example 18 that the catalyst provided by the present invention has a good hydrogen response.

Group IV

Examples and Comparative Examples

Example 1

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with TiCl$_4$ within 1 hour, and slowly heated to 80° C. to gradually precipitate a solid. Then, 2-isopropyl-2-isopentyl-1,3-dimethoxypropane of the Formula IV as an electron donor (0.006 mol) was added. The obtained mixture was kept for 1 hour, then filtered thermally, added with 150 mL of methylbenzene, and washed twice to obtain a solid. The mixture was added with 100 mL of methylbenzene, heated to 110° C., washed for three times with each time lasting for 10 minutes. The mixture was again added with 2-(2,6-diisopropylphenylimino)methyl-4,6-di-tert-butylphenol of the Formula II as an electron donor (0.006 mol) and 60 mL of hexane, stirred for 30 minutes, and was again added with 60 mL of hexane, washed for three times to obtain a solid (catalyst component) of 7.4 g, containing 3.6% Ti, 23.2% Mg, and 50.7% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

Example 2

The steps of the present example were the same as those of example 1 of the present group, except that the compound 2-isopropyl-2-isopentyl-1,3-dimethoxypropane as the electron donor was substituted with 9,9-dimethoxymethylfluorene. See Table 4 for specific data.

Example 3

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with TiCl$_4$ within 1 hour, and slowly heated to 80° C. to gradually precipitate a solid. Then, 2-isopropyl-2-isopentyl-1,3-dimethoxypropane of the Formula IV as an electron donor (0.003 mol), and 2-(8-quinolylimino)methyl-4,6-di-tert-butylphenol of the Formula II as an electron donor (0.003 mol) were added. The resulting mixture was kept for 1 hour, then filtered thermally, added with 150 mL of methylbenzene, and washed twice obtain a solid. The mixture was added with 100 mL of methylbenzene, stirred for 30 minutes, heated to 110° C., and washed for three times with each time lasting for 10 minutes. The mixture was again added 60 mL of hexane, and washed for three times to obtain a solid (catalyst component) of 6.9 g, containing 3.3% Ti, 22.5% Mg, and 51.6% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

Example 4

The steps of the present example were the same as those of example 3 of the present group, except that the compound 2-(8-quinolylimino)methyl-4,6-di-tert-butyl phenol as the electron donor was substituted with 2-(2,6-diisopropylphenylimino)methyl-4,6-di-tert-butylphenol. See Table 4 for specific data.

Example 5

The steps of the present example were the same as those of example 3 of the present group, except that the compound 2-(8-quinolylimino)methyl-4,6-di-tert-butyl phenol as the electron donor was substituted with 2-(2,6-diisopropylphenylimino)methyl-4-tert-butylphenol. See Table 4 for specific data.

Example 6

The steps of the present example were the same as those of example 3 of the present group, except that the compound 2-(8-quinolylimino)methyl-4,6-di-tert-butyl phenol as the electron donor was substituted with 2-(3-quinolylimino)methyl-4,6-di-tert-butylphenol. See Table 4 for specific data.

Example 7

The steps of the present example were the same as those of example 3 of the present group, except that the compound 2-(8-quinolylimino)methyl-4,6-di-tert-butyl phenol as the electron donor was substituted with 2-(p-bromophenylimino)methyl-4,6-di-tert-butylphenol. See Table 4 for specific data.

Example 8

The steps of the present example were the same as those of example 3 of the present group, except that the compound 2-(8-quinolylimino)methyl-4,6-di-tert-butyl phenol as the electron donor was substituted with N-(1-naphthylmethylene)-2,6-diisopropyl aniline. See Table 4 for specific data.

Example 9

The steps of the present example were the same as those of example 3 of the present group, except that the compound 2-isopropyl-2-isopentyl-1,3-dimethoxy propane as the electron donor was substituted with 9,9-dimethoxymethylfluorene. See Table 4 for specific data.

Example 10

(1) Preparation of a Catalyst Component 300 mL of TiCl$_4$ was placed into a reactor replaced by high-purity nitrogen, cooled to −20° C., and was added with 7 g of alcohol adduct of magnesium chloride (see patent CN1330086A). The resulting mixture was stirred and heated in stages. When the mixture was heated to 40° C., the compound 2-isopropyl-2-isopentyl-1,3-dimethoxy propane of the Formula IV (0.003 mol), and the compound 2-(2,6-diisopropylphenylimino)methyl-4,6-di-tert-butylphenol (0.003 mol) as electron donors were added. The resulting mixture was kept for 2 hours, filtered, added with 100 mL of $TiCl_4$, heated to 110° C., and treated for three times. After that, the mixture was added with 60 mL of hexane, and washed for three times to obtain a solid (catalyst component) of 7.1 g, containing 3.7% Ti, 23.6% Mg, and 51.0% Cl.

(2) Polymerization of Propylene 2.5 mL of $AlEt_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

Example 11

(1) Preparation of a Catalyst Component 300 mL of $TiCl_4$ was placed into a reactor replaced by high-purity nitrogen, cooled to −20° C., and was added with 7 g of magnesium ethylate carriers. The resulting mixture was stirred and heated in stages. When the mixture was heated to 40° C., the compound 2-isopropyl-2-isopentyl-1,3-dimethoxy propane of the Formula IV (0.003 mol), and the compound 2-(3-quinolylimino)methyl-4,6-di-tert-butylphenol (0.003 mol) as electron donors were added. The resulting mixture was kept for 2 hours, filtered, added with 100 mL of $TiCl_4$, heated to 110° C., and treated for three times. After that, the mixture was added with 60 mL of hexane, and washed for three times to obtain a solid (catalyst component) of 6.7 g, containing 3.4% Ti, 22.6% Mg, and 49.6% Cl.

(2) Polymerization of Propylene 2.5 mL of $AlEt_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

Example 12

The steps of the present example were the same as those of example 1 of the present group, except that the time of the polymerization reaction was extend to 2 hours. See Table 4 for the results.

Example 13

The steps of the present example were the same as those of example 1 of the present group, except that the time of the polymerization reaction was extend to 3 hours. See Table 4 for the results.

Example 14

The steps of the present example were the same as those of example 4 of the present group, except that the time of the polymerization reaction was extend to 2 hours. See Table 4 for the results.

Example 15

The steps of the present example were the same as those of example 4 of the present group, except that the time of the polymerization reaction was extend to 3 hours. See Table 4 for the results.

Example 16

The steps of the present example were the same as those of example 4 of the present group, except that the amount of the added hydrogen gas was changed to 7.2 NL. See Table 4 for the results.

Example 17

The steps of the present example were the same as those of example 3 of the present group, except that the amount of the added compound 2-(8-quinolylimino)methyl-4,6-di-tert-butylphenol was changed to 0.006 mol. See Table 4 for the results.

Example 18

The steps of the present example were the same as those of example 3 of the present group, except that the amount of the added compound 2-(8-quinolylimino)methyl-4,6-di-tert-butylphenol was changed to 0.0015 mol. See Table 4 for the results.

Comparative Example 1

Steps of comparative example 1 were the same as those of example 3 of the present group, except that the no 2-(8-quinolylimino)methyl-4,6-di-tert-butylphenol was added, and that the amount of the added 2-isopropyl-2-isopentyl-1,3-dimethoxypropane was 0.006 mol. See Table 4 for specific data.

TABLE 4

| | Catalyst Activity (Kg polymer/ g catalyst) | Polymer Isotacticity (%) | Melt Index M.I (g/10 min) | $M_w/M_n$ |
|---|---|---|---|---|
| Example 1 | 37.5 | 97.6 | 8.0 | 6.4 |
| Example 2 | 43.8 | 97.9 | 8.1 | 6.4 |
| Example 3 | 41.5 | 97.7 | 8.1 | 6.5 |
| Example 4 | 39.0 | 97.8 | 8.0 | 6.6 |
| Example 5 | 38.6 | 97.6 | 8.1 | 6.8 |
| Example 6 | 38.3 | 97.7 | 8.2 | 6.5 |
| Example 7 | 34.6 | 97.6 | 8.2 | 6.6 |
| Example 8 | 38.3 | 98.1 | 6.6 | 6.6 |
| Example 9 | 34.3 | 98.0 | 8.3 | 5.6 |
| Example 10 | 38.1 | 97.9 | 8.4 | 6.2 |

TABLE 4-continued

|  | Catalyst Activity (Kg polymer/ g catalyst) | Polymer Isotacticity (%) | Melt Index M.I (g/10 min) | $M_w/M_n$ |
|---|---|---|---|---|
| Example 11 | 40.6 | 97.9 | 8.3 | 6.8 |
| Example 12 | 72.7 | 97.9 | 7.9 | — |
| Example 13 | 98.5 | 97.6 | 8.0 | — |
| Example 14 | 71.5 | 98.0 | 8.1 | — |
| Example 15 | 98.9 | 98.1 | 8.2 | — |
| Example 16 | 45.1 | 97.4 | 98.3 | — |
| Example 17 | 42.0 | 97.6 | 8.8 | 6.9 |
| Example 18 | 43.7 | 97.8 | 8.0 | 6.5 |
| Comparative Example 1 | 39.3 | 97.8 | 7.2 | 5.5 |

As can be seen from Table 4, the catalyst provided by the present invention can widen the molecular weight distribution, and improve isotacticity, and has a good orientation ability. Meanwhile, the obtained catalyst has a high catalytic activity, and the polymer obtained has a high melt index and isotacticity. This means that the polymer obtained has a good mechanic property, flowing property, and processability. Specifically, compared with the use of only one compound B (e.g., diether compound as internal electron donors in comparative example 1) as the internal electron donor, the use of the compound of Formula II of the present invention and the one compound B (examples 1 to 8) as internal electron donors can widen the molecular weight distribution, improve isotacticity of the polymer and enhance the orientation ability of the catalyst. Meanwhile, the catalyst provided by the present invention also has a high catalytic activity, and the polymer has a high melt index. Besides, it can be seen from examples 12 to 15 that the obtained catalyst decreases more slowly in activity, and hence has a higher long-term stability. It can be seen from example 16 that the catalyst provided by the present invention has a good hydrogen response.

Group V

Examples and Comparative Examples

Example 1

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with TiCl$_4$ within 1 hour, and slowly heated to 80° C. to gradually precipitate a solid. Then, 2,4-dibenzoyloxypentane of the Formula III as an electron donor (0.006 mol) was added. The obtained mixture was kept for 1 hour, then filtered thermally, added with 150 mL of methylbenzene, and washed twice to obtain a solid. The mixture was added with 100 mL of methylbenzene, heated to 110° C., washed for three times with each time lasting for 10 minutes. The mixture was again added with 2-(2,6-diisopropylphenylimino)methyl-4,6-di-tert-butylphenol of the Formula II (0.006 mol) and 60 mL of hexane, stirred for 30 minutes, and was again added with 60 mL of hexane, washed for three times to obtain a solid (catalyst component) of 7.4 g, containing 3.8% Ti, 24.2% Mg, and 50.6% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 5 for specific data.

Example 2

The steps of the present example were the same as those of example 1 of the present group, except that the compound 2,4-dibenzoyloxypentane as the electron donor was substituted with 3,5-dibenzoyloxy heptane. See Table 5 for specific data.

Example 3

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with TiCl$_4$ within 1 hour, and slowly heated to 80° C. to gradually precipitate the solid substance. Then, a compound 2,4-dibenzoyloxypentane of the Formula III as a electron donor (0.003 mol), and a compound 2-(8-quinolylimino)methyl-4,6-di-tert-butylphenol of the Formula II as an electron donor (0.003 mol) were added. The resulting mixture was kept for 1 hour, then filtered thermally, added with 150 mL of methylbenzene, and washed twice to obtain a solid. The mixture was added with 100 mL of methylbenzene, stirred for 30 minutes, heated to 110° C., and washed for three times with each time lasting for 10 minutes. The mixture was again added with 60 mL of hexane, and washed for three times to obtain a solid (catalyst component) of 6.9 g, containing 3.5% Ti, 23.5% Mg, and 52.0% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 5 for specific data.

Example 4

The steps of the present example were the same as those of example 3 of the present group, except that the compound 2-(8-quinolylimino)methyl-4,6-di-tert-butyl phenol as the electron donor was substituted with 2-(2,6-diisopropylphenylimino)methyl-4,6-di-tert-butylphenol. See Table 5 for specific data.

Example 5

The steps of the present example were the same as those of example 3 of the present group, except that the compound 2-(8-quinolylimino)methyl-4,6-di-tert-butyl phenol as the electron donor was substituted with 2-(2,6-diisopropylphenylimino)methyl-4-tert-butylphenol. See Table 5 for specific data.

Example 6

The steps of the present example were the same as those of example 3 of the present group, except that the compound 2-(8-quinolylimino)methyl-4,6-di-tert-butyl phenol as the electron donor was substituted with 2-(2,6-dimethylphenylimino)methyl-4-tert-butylphenol. See Table 5 for specific data.

Example 7

The steps of the present example were the same as those of example 3 of the present group, except that the compound 2-(8-quinolylimino)methyl-4,6-di-tert-butyl phenol as the electron donor was substituted with 2-(3-quinolylimino)methyl-4,6-di-tert-butyl phenol. See Table 5 for specific data.

Example 8

The steps of the present example were the same as those of example 3 of the present group, except that the compound 2-(8-quinolylimino)methyl-4,6-di-tert-butyl phenol as the electron donor was substituted with 2-(4-quinolylimino)methyl-4,6-di-tert-butyl phenol. See Table 5 for specific data.

Example 9

The steps of the present example were the same as those of example 3 of the present group, except that the compound 2-(8-quinolylimino)methyl-4,6-di-tert-butyl phenol as the electron donor was substituted with 2-(p-bromophenylimino)methyl-4,6-di-tert-butylphenol. See Table 5 for specific data.

Example 10

The steps of the present example were the same as those of example 3 of the present group, except that the compound 2-(8-quinolylimino)methyl-4,6-di-tert-butyl phenol as the electron donor was substituted with N-(1-naphthylmethylene)-2,6-diisopropyl aniline. See Table 5 for specific data.

Example 11

(1) Preparation of a Catalyst Component 300 mL of $TiCl_4$ was placed into a reactor replaced by high-purity nitrogen, cooled to −20° C., and was added with 7 g of alcohol adduct of magnesium chloride (see patent CN1330086A). The resulting mixture was stirred, and heated in stages. When the mixture was heated to 40° C., the compound 2,4-dibenzoyloxypentane of the Formula III (0.003 mol), and the compound 2-(2,6-diisopropylphenylimino)methyl-4,6-di-tert-butylphenol of the Formula II (0.003 mol) as electron donors were added. The resulting mixture was kept for 2 hours, filtered, added with 100 mL of $TiCl_4$, heated to 110° C., and treated for three times. After that, the mixture was added with 60 mL of hexane, and washed for three times to obtain a solid (catalyst component) of 6.7 g, containing 3.7% Ti, 26.6% Mg, and 51.6% Cl.

(2) Polymerization of Propylene 2.5 mL of $AlEt_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 5 for specific data.

Example 12

The steps of the present example were the same as those of example 1 of the present group, except that the time of the polymerization reaction was extend to 2 hours. See Table 5 for the results.

Example 13

The steps of the present example were the same as those of example 1 of the present group, except that the time of the polymerization reaction was extend to 3 hours. See Table 5 for the results.

Example 14

The steps of the present example were the same as those of example 7 of the present group, except that the time of the polymerization reaction was extend to 2 hours. See Table 5 for the results.

Example 15

The steps of the present example were the same as those of example 4 of the present group, except that the amount of the added hydrogen gas was changed to 7.2 NL. See Table 5 for the results.

Example 16

The steps of the present example were the same as those of example 4 of the present group, except that the time of the polymerization reaction was extend to 2 hours. See Table 5 for the results.

Example 17

The steps of the present example were the same as those of example 4 of the present group, except that the time of the polymerization reaction was extend to 3 hours. See Table 5 for the results.

Comparative Example 1

Steps of comparative example 1 were the same as those of example 3 of the present group, except that the no 2-(8- quinolylimino)methyl-4,6-di-tert-butylphenol was added, and that the amount of the added 2,4-dibenzoyloxy pentane was 0.006 mol. See Table 5 for specific data.

Comparative Example 2

The steps of comparative example 2 were the same as those of example 1 of the present group, except that the amount of the added hydrogen gas was changed to 7.2 NL. See Table 5 for the results.

TABLE 5

| | Catalyst Activity (Kg polymer/ g catalyst) | Polymer Isotacticity (%) | Melt Index M.I (g/10 min) | $M_w/M_n$ |
|---|---|---|---|---|
| Example 1 | 43.5 | 97.6 | 1.7 | 8.2 |
| Example 2 | 50.2 | 97.3 | 1.3 | 8.1 |
| Example 3 | 51.5 | 97.7 | 1.0 | 8.0 |
| Example 4 | 45.0 | 97.8 | 1.0 | 7.8 |
| Example 5 | 41.6 | 97.6 | 1.0 | 7.9 |
| Example 6 | 40.5 | 97.4 | 0.9 | 8.0 |
| Example 7 | 48.6 | 98.2 | 0.8 | 8.0 |
| Example 8 | 33.5 | 96.5 | 1.3 | 8.2 |
| Example 9 | 42.3 | 97.8 | 1.3 | 8.2 |
| Example 10 | 35.7 | 97.1 | 0.9 | 8.1 |
| Example 11 | 40.1 | 97.4 | 6.2 | 8.4 |
| Example 12 | 62.7 | 97.8 | 1.6 | — |
| Example 13 | 87.5 | 97.6 | 1.3 | — |
| Example 14 | 76.1 | 99.1 | 0.8 | — |
| Example 16 | 71.5 | 98.0 | 1.5 | 7.7 |
| Example 17 | 88.9 | 98.1 | 1.6 | 7.6 |
| Comparative Example 1 | 44.3 | 97.9 | 2.4 | 6.9 |
| Example 15 | 56.7 | 95.6 | 32.5 | — |
| Comparative Example 2 | 45.7 | 97.8 | 20.4 | — |

As can be seen from Table 5, the catalyst provided by the present invention can widen the molecular weight distribution, improve isotacticity, and has a good orientation ability. Meanwhile, the obtained catalyst has a high catalytic activity, and the polymer obtained has a high melt index and isotacticity. This means that the polymer obtained has a good mechanic property, flowing property, and processability. Specifically, compared with the use of only one compound B (e.g., diol ester compound as internal electron donors in comparative example 1) as the internal electron donor, the use of the compound of Formula II of the present invention and the compound B as internal electron donors (examples 1 to 11) can widen the molecular weight distribution of the polymer. Meanwhile, the catalyst provided by the present invention also has a high catalytic activity, and a good orientation ability, and the polymer has a high melt index and isotacticity. Besides, it can be seen from examples 12 to 14 and 16 to 17 that the obtained catalyst decreases more slowly in activity, and has a higher long-term stability. It can be seen from example 15 and comparative example 2 that the catalyst provided by the present invention has a good hydrogen response.

It can also be seen from a comparison between the data of comparative examples 1 and 2 and the data of the examples that, when used in propene polymerization reaction, the catalyst provided by the present invention, on the one hand, has a high catalytic activity and a good hydrogen response, and is low in decrease of activity, and on the other hand, can enable the obtained polymer to have a high isotacticity (up to 99.1%; see example 14), a high melt index, and a wider molecular weight distribution, thereby leading to a wide application of the polymer.

Group VI

Examples and Comparative Examples

Example 1

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with $TiCl_4$ within 1 hour, and slowly heated to 80° C. to gradually precipitate a solid. Then, DNBP (0.006 mol) was added. The obtained mixture was kept for 1 hour, then filtered thermally, added with 150 mL of methylbenzene, and washed twice to obtain a solid. The mixture was added with 100 mL of methylbenzene, heated to 110° C., washed for three times with each time lasting for 10 minutes. The mixture was added with a compound 2-(2,6-dimethylphenylimino)methyl-4,6-di-tert-butylphenol of the Formula II (0.006 mol) and 60 mL of hexane, stirred for 30 minutes, and was again added with 60 mL of hexane, washed for three times to obtain a solid (catalyst component) of 7.4 g, containing 3.8% Ti, 24.2% Mg, and 52.6% Cl.

(2) Polymerization of Propylene 2.5 mL of $AlEt_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 6 for specific data.

Example 2

The steps of the present example were the same as those of example 1 of the present group, except that the compound DNBP was substituted with DIBP (diisobutyl phthalate). See Table 6 for specific data.

Example 3

(1) Preparation of a Catalyst Component 4.8 g of magnesium chloride, 95 mL of methylbenzene, 4 mL of epoxy chloropropane, and 12.5 mL of tributyl phosphate (TBP) were placed one by one into a reactor replaced by high-purity nitrogen. The obtained mixture was stirred and heated to be kept at 50° C. for 2.5 hours. After a complete dissolution of the solid, 1.4 g of phthalic anhydride was added to the obtained solution. The solution was kept for 1 hour, cooled to a temperature below −25° C., added with $TiCl_4$ within 1 hour, and slowly heated to 80° C. to gradually precipitate a solid. Then, DNBP (0.003 mol), and a compound 2-(8-quinolylimino)methyl-4,6-di-tert-butylphenol of the Formula II (0.003 mol) were added. The resulting mixture was kept for 1 hour, then filtered thermally, added with 150 mL of methylbenzene, and washed twice to obtain a solid. The mixture was added with 100 mL of methylbenzene, stirred for 30 minutes, heated to 110° C., and washed for three times with each time lasting for 10 minutes. The mixture was again added with 60 mL of hexane, and washed for three times to obtain a solid (solid catalyst component) of 6.9 g, containing 3.5% Ti, 22.5% Mg, and 51.6% Cl.

(2) Steps of polymerization of propylene were the same as example 1 of the present group. See Table 6 for specific data.

Example 4

The steps of the present example were the same as those of example 1 of the present group, except that the compound 2-(8-quinolylimino)methyl-4,6-di-tert-butyl phenol was substituted with 2-(2,6-diisopropylphenylimino)methyl-4,6-di-tert-butylphenol. See Table 6 for specific data.

Example 5

The steps of the present example were the same as those of example 3 of the present group, except that the compound 2-(8-quinolylimino)methyl-4,6-di-tert-butyl phenol was substituted with 2-(3-quinolylimino)methyl-4,6-di-tert-butyl phenol. See Table 6 for specific data.

Example 6

(1) Preparation of a Catalyst Component 300 mL of TiCl$_4$ was placed into a reactor replaced by high-purity nitrogen, cooled to −20° C., and was added with 7 g of an alcohol adduct of magnesium chloride (see patent CN1330086A). The resulting mixture was stirred, and heated in stages. When the mixture was heated to 40° C., the compound DNBP (0.003 mol), and the compound 2-(2,6-diisopropylphenylimino)methyl-4,6-di-tert-butylphenol of the Formula II (0.003 mol) were added. The resulting mixture was kept for 2 hours, filtered, added with 100 mL of TiCl$_4$, heated to 110° C., and treated for three times. After that, the mixture was added with 60 mL of hexane, and washed for three times to obtain a solid (solid catalyst component) of 7.1 g, containing 3.5% Ti, 26.6% Mg, and 50.6% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that aPP resin could be obtained. See Table 6 for specific data.

Example 7

(1) Preparation of a Catalyst Component 300 mL of TiCl$_4$ was placed into a reactor replaced by high-purity nitrogen, cooled to −20° C., and was added with 7 g of magnesium ethylate. The resulting mixture was stirred, and heated in stages. When the mixture was heated to 40° C., the compound DNBP (0.003 mol), and the compound 2-(3-quinolylimino)methyl-4,6-di-tert-butylphenol of the Formula II (0.003 mol) were added. The resulting mixture was kept for 2 hours, filtered, added with 100 mL of TiCl$_4$, heated to 110° C., and treated for three times. After that, the mixture was added with 60 mL of hexane, and washed for three times to obtain a solid (solid catalyst component) of 6.1 g, containing 3.2% Ti, 20.8% Mg, and 49.5% Cl.

(2) Polymerization of Propylene 2.5 mL of AlEt$_3$, and 5 mL of cyclohexyl methyl dimethoxy silane enabling Al/Si (mol)=25 were placed into a stainless reactor having a volume of 5 L and replaced by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 6 for specific data.

Example 8

The steps of the present example were the same as those of example 7 of the present group, except that the compound 2-(3-quinolylimino)methyl-4,6-di-tert-butylphenol was substituted with N-(1-naphthylmethylene)-2,6-diisopropyl aniline. See Table 6 for specific data.

Example 9

The steps of the present example were the same as those of example 1 of the present group, except that the time of the polymerization reaction was extend to 2 hours. See Table 6 for the results.

Example 10

The steps of the present example were the same as those of example 1 of the present group, except that the time of the polymerization reaction was extend to 3 hours. See Table 6 for the results.

Example 11

The steps of the present example were the same as those of example 1 of the present group, except that the amount of the added hydrogen gas was changed to 7.2 NL. See Table 6 for the results.

Example 12

The steps of the present example were the same as those of example 4 of the present group, except that the time of the polymerization reaction was extend to 2 hours. See Table 6 for the results.

Example 13

The steps of the present example were the same as those of example 4 of the present group, except that the time of the polymerization reaction was extend to 3 hours. See Table 6 for the results.

Comparative Example 1

Steps of comparative example 1 were the same as those of example 1 of the present group, except that the no 2-(2,6- dimethylphenylimino)methyl-4,6-di-tert-butylphenol was added, and that the amount of the added DNBP was 0.006 mol. See Table 6 for specific data.

Comparative Example 2

The steps of comparative example 2 were the same as those of comparative example 1 of the present group, except that the amount of the added hydrogen was changed to 7.2 NL. See Table 6 for specific data.

TABLE 6

| | Catalyst Activity (Kg polymer/ g catalyst) | Polymer Isotacticity (%) | Melt Index M.I (g/10 min) | $M_w/M_n$ |
|---|---|---|---|---|
| Example 1 | 35.5 | 97.1 | 3.9 | 7.1 |
| Example 2 | 43.2 | 97.6 | 2.4 | 6.8 |
| Example 3 | 44.7 | 96.6 | 2.4 | 7.1 |
| Example 4 | 43.7 | 97.6 | 2.4 | 7.1 |
| Example 5 | 40.8 | 97.7 | 2.7 | 7.3 |
| Example 6 | 45.6 | 97.2 | 6.0 | 8.1 |
| Example 7 | 48.6 | 97.8 | 6.3 | 8.1 |
| Example 8 | 47.2 | 98.1 | 6.4 | 8.1 |
| Example 9 | 51.3 | 97.7 | 3.0 | — |
| Example 10 | 73.6 | 98.0 | 3.4 | — |
| Example 11 | 48.5 | 95.4 | 45.3 | — |
| Example 12 | 58.8 | 97.3 | 3.1 | — |
| Example 13 | 76.6 | 97.4 | 3.0 | — |
| Comparative Example 1 | 32.5 | 98.0 | 1.2 | 3.8 |
| Comparative Example 2 | 43.8 | 96.3 | 28.6 | — |

Note:
"—" in the above Table indicates that no data is available.

As can be seen from Table 6, the catalyst provided by the present invention can greatly widen the molecular weight distribution, and increase activity of the catalyst. Meanwhile, the polymer obtained has a high melt index and isotacticity. This means that the polymer obtained has a good mechanic property, flowing property, and processability. Specifically, compared with the use of only one compound B (e.g., dicarboxylic ester compound as internal electron donor in comparative example 1) as the internal electron donor, the use of the compound of Formula II of the present invention and the compound B (examples 1 to 8) as internal electron donors can widen the molecular weight distribution of the polymer, and increase catalytic activity of the catalyst. The catalyst provided by the present invention also has a good orientation ability, and the polymer has a high melt index and isotacticity. Besides, it can be seen from examples 9 to 10 and 12 to 13 that the obtained catalyst is slow in activity attenuation, and thus has a higher long-term stability. It can be seen from examples 11 and comparative example 2 that the catalyst provided by the present invention has a good hydrogen response.

From all the above examples as well as Tables 1 to 6, it can be seen that according to the present invention, the catalyst containing the imine compounds of the Formula I as electron donors is capable of widening the molecular weight distribution, enabling the obtained catalyst to have a relatively high catalytic activity and to be slow in activity attenuation, i.e., to have a higher long-term stability, and enabling the obtained polymer to have a high isotacticity and a suitable melt index. This means that the polymer obtained has a good mechanic property, flowing property, and processability. In addition, the catalyst provided by the present invention has a good hydrogen response. The catalyst is applicable to production of high-impact polymer products.

It should be noted that the examples above are provided only for illustrating the present invention, rather than restricting the present invention. The present invention is described in detail in connection with typical examples, but it should be readily understood that the expressions used herein are merely descriptive and explanatory, not prescriptive. Amendments can be made to the present invention based on the disclosure of the claims and within the scope and spirit of the present invention. While the above descriptions about the present invention involve particular methods, materials, and implementing examples, it does not means that the present invention is limited to the presently disclosed examples. On the contrary, the present invention can be extended to other methods and applications having same functions as those of the present invention.

The invention claimed is:

1. A catalyst component for propene polymerization comprising titanium, magnesium, halogen and internal electron donor A, wherein said internal electron donor A is selected from compounds as shown in the Formula I,

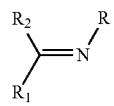

Formula I wherein, R is selected from hydrogen, hydroxyl, and substituted or unsubstituted $C_1$-$C_{30}$ hydrocarbyl; $R_1$ and $R_2$ may be identical to or different from each other, and are selected from hydrogen and unsubstituted $C_1$-$C_{20}$ alkyl, unsubstituted $C_6$-$C_{30}$ aryl, and substituted or unsubstituted $C_7$-$C_{30}$ arylalkyl.

2. The catalyst component according to claim 1, wherein R is selected from hydrogen, hydroxyl, $C_1$-$C_{10}$ alkyl, and halogen or hydroxy substituted $C_6$-$C_{10}$ aryl, $C_6$-$C_{15}$ heteroaryl, $C_7$-$C_{15}$ arylalkyl and $C_7$-$C_{15}$ alkylaryl; $R_1$ and $R_2$ may be identical to or different from each other, and are selected from hydrogen, unsubstituted $C_1$-$C_{10}$ alkyl, unsubstituted $C_6$-$C_{20}$ aryl, and substituted or unsubstituted.

3. A catalyst component for propene polymerization, comprising titanium, magnesium, and internal electron donor A, wherein said internal electron donor A is selected from compounds as shown in Formula II,

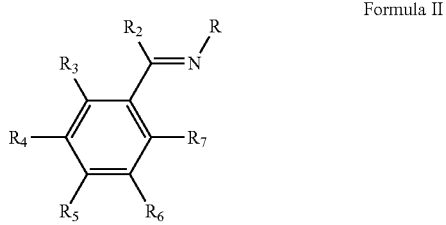

Formula II wherein, R is selected from hydrogen, hydroxyl, and unsubstituted $C_1$-$C_{20}$ alkyl, unsubstituted $C_6$-$C_{30}$ aryl, substituted or unsubstituted $C_6$-$C_{30}$ heteroaryl, and substituted or unsubstituted $C_7$-$C_{30}$ arylalkyl;
$R_2$ is selected from hydrogen, and substituted or unsubstituted $C_1$-$C_{30}$ hydrocarbyl;
$R_3$-$R_7$ may be identical to or different from each other, and are each independently selected from hydrogen, halogen atoms, hydroxyl, $C_1$-$C_{10}$ alkyl, $C_1$-$C_{10}$ alkoxy, $C_6$-$C_{10}$ aryl, $C_7$-$C_{12}$ alkylaryl, $C_7$-$C_{12}$ arylalkyl, and $C_2$-$C_{12}$ alkenyl;

$R_3$-$R_7$ can be optionally bonded together to form a ring.

4. The catalyst component according to claim 1, wherein said internal electron donor A is at least one selected from the group consisting of N-butylidene aniline, 2,6-dimethyl-N-butylidene aniline, 4-chloro-N-butylidene aniline, N-(2-methylpropylidene)aniline, N-butylidene parabromoaniline, 2,6-diisopropyl-N-(2-methylpropylidene)aniline, 2,6-diisopropyl-N-butylidene aniline, 4-trifluoromethyl-N-butylidene aniline, 2,4,6-trimethyl-N-butylidene aniline, N-(2-methylpropylidene)-1-butylamine, N-(2-methylpropylidene)-2-butylamine, N-hexylidene-1-hexylamine, N-hexylidene-1-octylamine, N-pentylidene-1-octylamine, 2,6-diisopropyl-N-heptamethyleneaniline, 2,6-diisopropyl-N-(2,2-diphenyl ethylidene)aniline, 2,6-dimethyl-N-(2,2-diphenylethylidene)aniline, N-(2-phenylethylidene)-8-amino quinoline, N-butylidene-3-amino quinoline, 2,6-dimethyl-N-hexylideneaniline, 2,6-diisopropyl-N-hexylideneaniline, 2,6-diisopropyl-N-(2-methylpropylidene)aniline, 2,6-dimethyl-N-(2-methylpropylidene)aniline, 2,6-diisopropyl-N-(diphenylmethylene)aniline, 2,6-dimethyl-N-(diphenylmethylene)aniline, 2,6-diisopropyl-N-(2-phenyl ethylidene)aniline, 2,6-dimethyl-N-(2-phenyl ethylidene)aniline, 4-methyl-N-(3-heptamethylene)aniline, N-heptamethyleneaniline, 2,6-diisopropyl-N-pentylideneaniline, 2,6-diisopropyl-N-(2-pentylidene)aniline, N-(3-pentylidene)-1-naphthylamine, N-(4-heptamethylene)-1-naphthylamine, 4-hydroxy-N-diphenylmethylene-1-naphthylamine, N-diphenylmethylenebenzylamine, N-(2-phenyl ethylidene)benzylamine, 2,6-dimethyl-N-(2,2-diphenyl ethylide2-(8-quinolylimino)methyl-4,6-ditertiary butylphenol ne)aniline, 2,6-diisopropyl N-(2,2-diphenyl ethylidene)aniline, N-(2,2-diphenyl ethylidene)aniline, N-(2,2-diphenyl ethylidene)-8-amino quinoline, N-(2,2-diphenyl ethylidene)-3-amino quinoline, N-phenylmethylene-2,6-diisopropylaniline, N-phenylmethylene-2,6-dimethylaniline, N-(2-naphthylmethylene)-2,6-diisopropylaniline, N-(1-naphthylmethylene)-2,6-diisopropylaniline, N-(1-naphthylmethylene)-2,6-dimethylaniline, N-(2-anthrylmethylene)-2,6-diisopropylaniline, and N-(1-anthrylmethylene)-2,6-dimethylaniline.

5. The catalyst component according to claim 1, wherein said internal electron donor A accounts for 0.01%-20% by weight of the catalyst component.

6. The catalyst component according to claim 1, wherein the catalyst component further comprises internal electron donor B, which is at least one selected from the group consisting of esters, ethers, ketones, and amines.

7. The catalyst component according to claim 6, wherein said internal electron donor B is at least one selected from the group consisting of 2,3-bis(2-ethylbutyl)succinic acid diethyl ester, 2,3-diethyl-2-isopropylsuccinic acid diethyl ester, 2,3-diisopropylsuccinic acid diethyl ester, 2,3-ditertiary butylsuccinic acid diethyl ester, 2,3-diisobutylsuccinic acid diethyl ester, 2,3-(bistrimethylsilylalkyl)succinic acid diethyl ester, 2-(3,3,3-trifluoropropyl)-3-methyl succinic acid diethyl ester, 2,3-dineopentyl succinic acid diethyl ester, 2,3-diisopentyl succinic acid diethyl ester, 2,3-(1-trifluoromethyl-ethyl)succinic acid diethyl ester, 2-isopropyl-3-isobutyl succinic acid diethyl ester, 2-tertiary butyl-3-isopropyl succinic acid diethyl ester, 2-isopropyl-3-cyclohexyl succinic acid diethyl ester, 2-isopentyl-3-cyclohexyl succinic acid diethyl ester, 2,2,3,3-tetramethyl succinic acid diethyl ester, 2,2,3,3-tetraethyl succinic acid diethyl ester, 2,2,3,3-tetrapropyl succinic acid diethyl ester, 2,3-diethyl-2,3-diisopropyl disuccinic acid diethyl ester, 2,3-bis(2-ethylbutyl)succinic acid diisobutyl ester, 2,3-diethyl-2-isopropylsuccinic acid diisobutyl ester, 2,3-diisopropylsuccinic acid diisobutyl ester, 2,3-ditertiary butylsuccinic acid diisobutyl ester, 2,3-diisobutylsuccinic acid diisobutyl ester, 2,3-(bistrimethylsilylalkyl)succinic acid diisobutyl ester, 2-(3,3,3-trifluoropropyl)-3-methylsuccinic acid diisobutyl ester, 2,3-dineopentylsuccinic acid diisobutyl ester, 2,3-diisopentylsuccinic acid diisobutyl ester, 2,3-(1-trifluoromethyl-ethyl)succinic acid diisobutyl ester, 2-isopropyl-3-isobutyl succinic acid diisobutyl ester, 2-tertiary butyl-3-isopropylsuccinic acid diisobutyl ester, 2-isopropyl-3-cyclohexylsuccinic acid diisobutyl ester, 2-isopentyl-3-cyclohexylsuccinic acid diisobutyl ester, 2,2,3,3-tetramethylsuccinic acid diisobutyl ester, 2,2,3,3-tetraethylsuccinic acid diisobutyl ester, 2,2,3,3-tetrapropylsuccinic acid diisobutyl ester, 2,3-diethyl-2,3-diisopropyl disuccinic acid diisobutyl ester, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methyl phthalate, di-n-butyl 2-methyl phthalate, diisobutyl 2-propyl phthalate, di-n-butyl 2-propyl phthalate, diisobutyl 2-butyl phthalate, din-butyl 2-butyl phthalate, diisobutyl 2-propyl phthalate, di-n-butyl 2-propyl phthalate, diisobutyl 4-propyl phthalate, di-n-butyl 4-butyl phthalate, diisobutyl 2-chloro phthalate, di-n-butyl 2-chloro phthalate, diisobutyl 4-chloro phthalate, di-n-butyl 4-chloro phthalate, and di-n-butyl 4-methoxy phthalate.

8. The catalyst component according to claim 6, wherein said internal electron donor B is at least one selected from diol ester compounds as shown in Formula III:

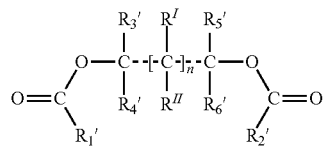

Formula III wherein, $R_1'$ and $R_2'$ may be identical to or different from each other, and are independently selected from $C_1$-$C_{20}$ alkyl, $C_6$-$C_{20}$ aryl, $C_7$-$C_{20}$ arylalkyl, and $C_7$-$C_{20}$ alkylaryl; $R_3'$-$R_6'$ may be identical to or different from each other, and are independently selected from hydrogen, $C_1$-$C_{20}$ alkyl, $C_6$-$C_{20}$ aryl, and $C_2$-$C_{12}$ alkenyl; $R^I$ and $R^{II}$ may be identical to or different from each other, and are independently selected from hydrogen, $C_1$-$C_{20}$ alkyl, $C_1$-$C_{20}$ crycloalkyl, $C_6$-$C_{20}$ aryl, $C_7$-$C_{20}$ arylalkyl, $C_9$-$C_{20}$ fused ring hydrocarbyl, and $C_2$-$C_{12}$ alkenyl; $R_3'$, $R_4'$, $R_5'$, $R_6'$, $R^I$, and $R^{II}$ can be optionally bonded together to form a ring; n is an integer ranging from 0 to 10.

9. The catalyst component according to claim 8, wherein said internal electron donor B is at least one selected from the group consisting of 2-isopropyl-1,3-dibenzoyloxy propane, 2-butyl-1,3-dibenzoyloxy propane, 2-cyclohexyl-1,3-dibenzoyloxy propane, 2-benzyl-1,3-dibenzoyloxy propane, 2-phenyl-1,3-dibenzoyloxy propane, 2-(1-naphthyl)-1,3-dibenzoyloxy propane, 2-isopropyl-1,3-diethylcarboxylpropane, 2-isopropyl-2-isopentyl-1,3-dibenzoyloxy propane, 2-isopropyl-2-isobutyl-1,3-dibenzoyloxy propane, 2-isopropyl-2-isopentyl-1,3-di(4-butylbenzoyloxy) propane, 2-isopropyl-2-isopentyl-1,3-dipropylcarboxyl propane, 2-isopropyl-2-butyl-1,3-dibenzoyloxy propane, 2-isopropyl-2-isopentyl-1-benzoyl oxy-3-butylcarboxyl propane, 2-isopropyl-2-isopentyl-1-benzoyloxy-3-cinnamylcarboxyl propane, 2-isopropyl-2-isopentyl-1-benzoyloxy-3-ethylcarboxyl propane, 2,2-dicyclopentyl-1,3-phenylcarboxyl propane, 2,2-dicyclohexyl-1,3-phenylcarboxyl propane, 2,2-dibutyl-1,3-phenylcarboxyl propane, 2,2-diisobutyl-1,3-phenylcarboxyl propane, 2,2-diisopropyl-1,3-diphenylcarboxyl propane, 2,2-diethyl-1,3-diphenylcarboxyl propane, 2-ethyl-2-butyl-1,3-diphenylcarboxyl propane, 2,4-dibenzoyloxy pentane, 3-ethyl-2,4-dibenzoyloxy pentane, 3-methyl-2,4-dibenzoyloxy pentane, 3-propyl-2,4-dibenzoyloxy pentane, 3-isopropyl-2,4-dibenzoyloxy pentane, 2,4-di(2-propylbenzoyloxy) pentane, 2,4-di(4-propylbenzoyloxy) pentane, 2,4-di(2,4-dimethylbenzoyloxy) pentane, 2,4-di(2,4-dichlorobenzoyloxy) pentane, 2,4-di(4-chlorobenzoyloxy) pentane, 2,4-di(4-isopropylbenzoyloxy) pentane, 2,4-di(4-butylbenzoyloxy) pentane, 2,4-di(4-isobutylbenzoyloxy) pentane, 3,5-dibenzoyloxy heptane, 4-ethyl-3,5-dibenzoyloxy heptane, 4-propyl-3,5-dibenzoyloxy heptane, 4-isopropyl-3,5-dibenzoyloxy heptane, 3,5-di(4-propylbenzoyloxy) heptane, 3,5-di(4-isopropylbenzoyloxy) heptane, 3,5-di(4-isobutylbenzoyloxy) heptane, 3,5-di(4-butylbenzoyloxy) heptane, 2-benzoyloxy-4-(4-isobutylbenzoyloxy) pentane, 2-benzoyloxy-4-(4-butylbenzoyloxy) pentane, 2-benzoyloxy-4-(4-propylbenzoyloxy) pentane, 3-benzoyloxy-5-(4-isobutylbenzoyloxy) heptane, 3-benzoyloxy-5-(4-butylbenzoyloxy) heptane, 3-benzoyloxy-5-(4-propyl benzoyloxy) heptane, 9,9-dibenzoyloxymethyl fluorene, 9,9-di(propylcarboxylmethyl) fluorene, 9,9-di(isobutylcarboxylmethyl) fluorene, 9,9-di(butylcarboxylmethyl) fluorene, 9,9-dibenzoyloxymethyl-4-tertiarybutyl fluorene, 9,9-dibenzoyloxymethyl-4-propyl fluorene, 9,9-dibenzoyloxymethyl-1,2,3,4-tetrahydro fluorene, 9,9-dibenzoyloxymethyl-1,2,3,4,5,6,7,8-octahydro fluorene, 9,9-dibenzoyloxymethyl-2,3,6,7-diphenylpropylindene, 9,9-dibenzoyloxymethyl-1,8-dichloro fluorene, 7,7-dibenzoyloxymethyl-2,5-dinorbomadiene, 1,4-dibenzoyloxy butane, 2,3-diisopropyl-1,4-dibenzoyloxy butane, 2,3-dibutyl-1,4-dibenzoyloxy butane, 1,2-dibenzoyloxybenzene, 3-ethyl-1,2-dibenzoyloxy benzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 4-butyl-1,2-dibenzoyloxybenzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, 2-propyl-1,8-dibenzoyloxynaphthalene, and 4-propyl-1,8-dibenzoyloxynaphthalene.

10. The catalyst component according to claim 6, wherein said internal electron donor B is at least one selected from diether compounds as shown in Formula IV:

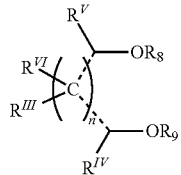

Formula IV wherein, $R_8$ and $R_9$ may be identical to or different from each other, and are independently selected from $C_1$-$C_{20}$ alkyl; $R^{III}$-$R^{IV}$ may be identical to or different from each other, and are independently selected from hydrogen, $C_1$-$C_{20}$ alkyl, $C_1$-$C_{20}$ cycloalkyl, $C_6$-$C_{20}$ aryl, $C_6$-$C_{20}$ alkylaryl, $C_6$-$C_{20}$ arylalkyl, and $C_2$-$C_{12}$ alkenyl, and $R^{III}$-$R^{VI}$ can be optionally bonded together to form a ring; n is an integer ranging from 0 to 10.

11. The catalyst component according to claim 10, wherein said internal electron donor B is at least one selected from the group consisting of 2-isopropyl-1,3-dimethoxy propane, 2-butyl-1,3-dimethoxy propane, 2-cyclohexyl-1,3-dimethoxy propane, 2-benzyl-1,3-dimethoxy propane, 2-phenyl-1,3-dimethoxy propane, 2-(1-naphthyl)-1,3-dimethoxy propane, 2-isopropyl-2-isopentyl-1,3-dimethoxy propane, 2-isopropyl-2-isobutyl-1,3-dimethoxy propane, 2-isopropyl-2-butyl-1,3-dimethoxy propane, 2,2-dicyclopentyl-1,3-dibenzoyloxypropane, 2,2-dicyclohexyl-1,3-dimethoxy propane, 2,2-dibutyl-1,3-dimethoxy propane, 2,2-diisobutyl-1,3-dimethoxy propane, 2,2-diisopropyl-1,3-dimethoxy propane, 2,2-diethyl-1,3-dimethoxy propane, 2-ethyl-2-butyl-1,3-dimethoxy propane, 2,4-dimethoxy pentane, 3-ethyl-2,4-dimethoxy pentane, 3-methyl-2,4-dimethoxy pentane, 3-propyl-2,4-dimethoxy pentane, 3-isopropyl-2,4-dimethoxy pentane, 3,5-dimethoxy heptane, 4-ethyl-3,5-dimethoxy heptane, 4-propyl-3,5-dimethoxy heptane, 4-isopropyl-3,5-dimethoxy heptane, 9,9-dimethoxymethyl fluorene, 9,9-dimethoxymethyl-4-tertiary butyl fluorene, 9,9-dimethoxymethyl-4-propyl fluorene, 9,9-dimethoxymethyl-1,2,3,4-tetrahydro fluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichloro fluorene, 7,7-dimethoxymethyl-2,5-dinorbomadiene, 1,4-dimethoxy butane, 2,3-diisopropyl-1,4-dimethoxy butane, 2,3-dibutyl-1,4-dimethoxy butane, 1,2-dimethoxybenzene, 3-ethyl-1,2-dimethoxybeneze, 4-butyl-1,2-dimethoxybeneze, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

12. The catalyst component according to claim 6, wherein said internal electron donor B accounts for 0.01-20% by weight of the catalyst component; and/or the molar ratio of internal electron donor A to internal electron donor B is in a range from 1:10 to 10:1.

13. A preparation method of the catalyst component according to claim 1, comprising the following steps:
    contacting at least one magnesium compound and at least one titanium compound with at least one internal electron donor compound, so as to prepare the catalyst component, wherein the internal electron donor compound comprises internal electron donor A, and optionally, internal electron donor B, and the internal electron donor A is at least one selected from the compounds as shown in Formula I.

14. The method according to claim 13, wherein calculated in per mole of magnesium, the adding amount of the internal electron donor A is in a range from 0.001 mol to 10 mol; and/or the adding amount of the internal electron donor B is in a range from 0 mol to 10 mol.

15. A catalyst used for propene polymerization, comprising a reactant of the following components:
 a). the catalyst component according to claim 1;
 b). an organoaluminium compound; and
 c). optionally, an organosilicon compound.

16. The catalyst according to claim 15, wherein the molar ratio of the organoaluminium compound b) to the catalyst component a), calculated in the ratio of aluminium/titanium, is in a range from 10:1 to 800:1, and/or the molar ratio of the organosilicon compound c) to the catalyst component a), calculated in the ratio of silicon to titanium, is in a range from 0:1 to 100:1.

17. A prepolymerization catalyst used for propene polymerization, comprising a prepolymer obtained by the prepolymerization of propene with the catalyst component according to claim 1.

18. A method for propene polymerization, comprising the step of polymerization of propene which is performed in the presence of the catalyst component according to claim 1, wherein said polymerization comprises homopolymerization or copolymerization.

19. The catalyst component according to claim 3, wherein R is selected from hydrogen, hydroxyl, and unsubstituted $C_1$-$C_{10}$ alkyl;
 $R_2$ is selected from hydrogen and substituted or unsubstituted $C_1$-$C_{20}$ alkyl, $C_6$-$C_{30}$ aryl, $C_7$-$C_{30}$ alkylaryl, and $C_7$-$C_{30}$ arylalkyl;
 $R_3$-$R_7$ are each independently selected from hydrogen, halogen atoms, hydroxyl, $C_1$-$C_6$ alkyl, $C_1$-$C_6$ alkoxy, phenyl, $C_7$-$C_{12}$ alkylphenyl, $C_7$-$C_{12}$ phenyl alkyl, and $C_2$-$C_6$ alkenyl.

20. The catalyst component according to claim 5, wherein said internal electron donor A accounts for 0.5%-15% by weight of the catalyst component.

21. The catalyst component according to claim 20, wherein said internal electron donor A accounts for 2%-10% by weight of the catalyst component.

22. The catalyst component according to claim 6, wherein said internal electron donor B is at least one selected from the group consisting of polycarboxylic acid ester compounds, diol ester compounds, and diether compounds.

23. The catalyst component according to claim 8, wherein $R_1'$ and $R_2'$ may be identical to or different from each other, and are independently selected from $C_1$-$C_6$ alkyl, phenyl, substituted phenyl, and cinnamyl; $R_3'$-$R_6'$ may be identical to or different from each other, and are independently selected from hydrogen, $C_1$-$C_6$ alkyl, phenyl, substituted phenyl, and $C_2$-$C_6$ alkenyl; $R^I$ and $R^{II}$ may be identical to or different from each other, and are independently selected from hydrogen, $C_1$-$C_6$ alkyl, $C_1$-$C_6$ crycloalkyl, benzyl, phenyl, substituted phenyl, naphthyl, and $C_2$-$C_6$ alkenyl; n is an integer ranging from 0 to 2; $R_3'$, $R_4'$, $R_5'$, $R_6'$, $R^I$, and $R^{II}$ can be optionally bonded together to form a ring.

24. The catalyst component according to claim 23, wherein said ring is an alicyclic ring or aromatic ring.

25. The catalyst component according to claim 10, wherein $R_8$ and $R_9$ may be identical to or different from each other, independently selected from $C_1$-$C_6$ alkyl; $R^{III}$-$R^{VI}$ may be identical to or different from each other, independently selected from hydrogen, $C_1$-$C_6$ alkyl, $C_3$-$C_6$ cycloalkyl, phenyl, substituted phenyl, benzyl, naphthalene, and $C_2$-$C_6$ alkenyl; n is an integer ranging from 0 to 2; $R^{III}$-$R^{VI}$ can be optionally bonded together to form a ring.

26. The catalyst component according to claim 25, wherein said ring is an alicyclic ring or aromatic ring.

27. The catalyst component according to claim 12, wherein said internal electron donor B accounts for 1-15% by weight of the catalyst component; and/or the molar ratio of internal electron donor A to internal electron donor B is in a range from 0.2:1 to 1:5.

28. The catalyst component according to claim 27, wherein the molar ratio of internal electron donor A to internal electron donor B is in a range from 0.5:1 to 2:1.

29. The method according to claim 14, wherein calculated in per mole of magnesium, the adding amount of the internal electron donor A is in a range from 0.001 mol to 5 mol; and/or the adding amount of the internal electron donor B is in a range from 0 mol to 5 mol.

30. The method according to claim 29, wherein calculated in per mole of magnesium, the adding amount of the internal electron donor A is in a range from 0.01 mol to 3 mol; and/or the adding amount of the internal electron donor B is in a range from 0.01 mol to 3 mol.

31. The catalyst component according to claim 1, wherein R is selected from hydrogen, hydroxyl, and substituted or unsubstituted $C_1$-$C_{20}$ alkyl, $C_6$-$C_{30}$ aryl, $C_6$-$C_{30}$ heteroaryl, $C_7$-$C_{30}$ alkylaryl, and $C_7$-$C_{30}$ arylalkyl.

32. The catalyst component according to claim 19, wherein R is selected from hydrogen, $C_1$-$C_{10}$ alkyl, and substituted or unsubstituted $C_6$-$C_{20}$ aryl, $C_7$-$C_{20}$ alkylaryl, and $C_7$-$C_{20}$ arylalkyl.

33. The catalyst component according to claim 3, wherein said internal electron donor A is at least one selected from the group consisting of 2-(phenylimino)methyl-4-tertiary butylphenol, 2-(phenylimino)methyl-4,6-ditertiary butylphenol, 2-(phenylimino)methyl-4-chlorophenol, 2-(phenylimino)methyl-4-fluorophenol, 2-(phenylimino)methyl-4,6-dichlorophenol, 2-(phenylimino)methyl-4-methylphenol, 2-(phenylimino)methyl-4-isopropylphenol, 2-(phenylimino) methylphenol, 2-(phenylimino)methyl-4-phenyl phenol, 2-(butylimino)methyl-4-tertiary butylphenol, 2-(butylimino)methyl-4,6-ditertiary butylphenol, 2-(hexylimino) methyl-4-tertiary butylphenol, 2-(hexylimino)methyl-4,6-ditertiary butylphenol, 2-(octylimino)methyl-4-tertiary butylphenol, 2-(octylimino)methyl-4,6-ditertiary butylphenol, 2-(phenylimino)methyl-4,6-ditertiary butylphenol, 2-(phenylimino)methyl-6-tertiary butylphenol, N-(3,5-ditertiary butylphenylmethylene)aniline, N-(3,5-ditertiary butylphenylmethylene)-1-naphthylamine, N-(3,5-ditertiary butylphenylmethylene)-2-naphthylamine, 2-(2-naphthylimino) methylphenol, 2-(4-quinolylimino)methyl-4,6-ditertiary butylphenol, 2-(3-quinolylimino)methyl-4,6-ditertiary butylphenol, 2-(8-quinolylimino)methyl-4,6-ditertiary butylphenol, and 2-(2-benzylimino)-4,6-ditertiary butylphenol.

34. The catalyst component according to claim 3, wherein said internal electron donor A accounts for 0.01%-20% by weight of the catalyst component.

35. The catalyst component according to claim 34, wherein said internal electron donor A accounts for 0.5%-15% by weight of the catalyst component.

36. The catalyst component according to claim 35, wherein said internal electron donor A accounts for 2%-10% by weight of the catalyst component.

37. The catalyst component according to claim 3, wherein the catalyst component further comprises internal electron donor B, which is at least one selected from the group consisting of esters, ethers, ketones, and amines.

38. The catalyst component according to claim 37, wherein the internal electron donor B is at least one selected from the group consisting of polycarboxylic acid ester compounds, diol ester compounds, and diether compounds.

39. The catalyst component according to claim 38, wherein said internal electron donor B is at least one selected from the group consisting of 2,3-bis(2-ethylbutyl)succinic acid diethyl ester, 2,3-diethyl-2-isopropylsuccinic acid diethyl ester, 2,3-diisopropylsuccinic acid diethyl ester, 2,3-ditertiary butylsuccinic acid diethyl ester, 2,3-diisobutylsuccinic acid diethyl ester, 2,3-(bistrimethylsilylalkyl)succinic acid diethyl ester, 2-(3,3,3-trifluoropropyl)-3-methyl succinic acid diethyl ester, 2,3-dineopentyl succinic acid diethyl ester, 2,3-diisopentyl succinic acid diethyl ester, 2,3-(1-trifluoromethyl-ethyl)succinic acid diethyl ester, 2-isopropyl-3-isobutyl succinic acid diethyl ester, 2-tertiary butyl-3-isopropyl succinic acid diethyl ester, 2-isopropyl-3-cyclohexyl succinic acid diethyl ester, 2-isopentyl-3-cyclohexyl succinic acid diethyl ester, 2,2,3,3-tetramethyl succinic acid diethyl ester, 2,2,3,3-tetraethyl succinic acid diethyl ester, 2,2,3,3-tetrapropyl succinic acid diethyl ester, 2,3-diethyl-2,3-diisopropyl disuccinic acid diethyl ester, 2,3-bis(2-ethylbutyl)succinic acid diisobutyl ester, 2,3-diethyl-2-isopropylsuccinic acid diisobutyl ester, 2,3-diisopropylsuccinic acid diisobutyl ester, 2,3-ditertiary butylsuccinic acid diisobutyl ester, 2,3-diisobutylsuccinic acid diisobutyl ester, 2,3-(bistrimethylsilylalkyl)succinic acid diisobutyl ester, 2-(3,3,3-trifluoropropyl)-3-methylsuccinic acid diisobutyl ester, 2,3-dineopentylsuccinic acid diisobutyl ester, 2,3-diisopentylsuccinic acid diisobutyl ester, 2,3-(1-trifluoromethyl-ethyl)succinic acid diisobutyl ester, 2-isopropyl-3-isobutyl succinic acid diisobutyl ester, 2-tertiary butyl-3-isopropylsuccinic acid diisobutyl ester, 2-isopropyl-3-cyclohexylsuccinic acid diisobutyl ester, 2-isopentyl-3-cyclohexylsuccinic acid diisobutyl ester, 2,2,3,3-tetramethylsuccinic acid diisobutyl ester, 2,2,3,3-tetraethylsuccinic acid diisobutyl ester, 2,2,3,3-tetrapropylsuccinic acid diisobutyl ester, 2,3-diethyl-2,3-diisopropyl disuccinic acid diisobutyl ester, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methyl phthalate, di-n-butyl 2-methyl phthalate, diisobutyl 2-propyl phthalate, di-n-butyl 2-propyl phthalate, diisobutyl 2-butyl phthalate, din-butyl 2-butyl phthalate, diisobutyl 2-propyl phthalate, di-n-butyl 2-propyl phthalate, diisobutyl 4-propyl phthalate, di-n-butyl 4-butyl phthalate, diisobutyl 2-chloro phthalate, di-n-butyl 2-chloro phthalate, diisobutyl 4-chloro phthalate, di-n-butyl 4-chloro phthalate, and di-n-butyl 4-methoxy phthalate.

40. The catalyst component according to claim 38, wherein said internal electron donor B is at least one selected from diol ester compounds as shown in Formula III:

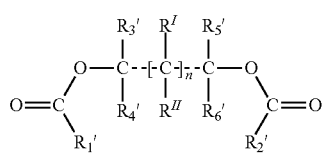

Formula III wherein, $R_1'$ and $R_2'$ may be identical to or different from each other, and are independently selected from $C_1$-$C_{20}$ alkyl, $C_6$-$C_{20}$ aryl, $C_7$-$C_{20}$ arylalkyl, and $C_7$-$C_{20}$ alkylaryl; $R_3'$-$R_6'$ may be identical to or different from each other, and are independently selected from hydrogen, $C_1$-$C_{20}$ alkyl, $C_6$-$C_{20}$ aryl, and $C_2$-$C_{12}$ alkenyl; $R^I$ and $R^{II}$ may be identical to or different from each other, and are independently selected from hydrogen, $C_1$-$C_{20}$ alkyl, $C_1$-$C_{20}$ crycloalkyl, $C_6$-$C_{20}$ aryl, $C_7$-$C_{20}$ arylalkyl, $C_9$-$C_{20}$ fused ring hydrocarbyl, and $C_2$-$C_{12}$ alkenyl; $R_3'$, $R_4'$, $R_5'$, $R_6'$, $R^I$, and $R^{II}$ can be optionally bonded together to form a ring; n is an integer ranging from 0 to 10.

41. The catalyst component according to claim 40, wherein $R_1'$ and $R_2'$ may be identical to or different from each other, and are independently selected from $C_1$-$C_6$ alkyl, phenyl, substituted phenyl, and cinnamyl; $R_3'$-$R_6'$ may be identical to or different from each other, and are independently selected from hydrogen, $C_1$-$C_6$ alkyl, phenyl, substituted phenyl, and $C_2$-$C_6$ alkenyl; $R^I$ and $R^{II}$ may be identical to or different from each other, and are independently selected from hydrogen, $C_1$-$C_6$ alkyl, $C_1$-$C_6$ crycloalkyl, benzyl, phenyl, substituted phenyl, naphthyl, and $C_2$-$C_6$ alkenyl; n is an integer ranging from 0 to 2; $R_3'$, $R_4'$, $R_5'$, $R_6'$, $R^I$, and $R^{II}$ can be optionally bonded together to form a ring.

42. The catalyst component according to claim 41, wherein said ring is an alicyclic ring or aromatic ring.

43. The catalyst component according to claim 40, wherein said internal electron donor B is at least one selected from the group consisting of 2-isopropyl-1,3-dibenzoyloxy propane, 2-butyl-1,3-dibenzoyloxy propane, 2-cyclohexyl-1,3-dibenzoyloxy propane, 2-benzyl-1,3-dibenzoyloxy propane, 2-phenyl-1,3-dibenzoyloxy propane, 2-(1-naphthyl)-1,3-dibenzoyloxy propane, 2-isopropyl-1,3-diethylcarboxylpropane, 2-isopropyl-2-isopentyl-1,3-dibenzoyloxy propane, 2-isopropyl-2-isobutyl-1,3-dibenzoyloxy propane, 2-isopropyl-2-isopentyl-1,3-di(4-butylbenzoyloxy) propane, 2-isopropyl-2-isopentyl-1,3-dipropylcarboxyl propane, 2-isopropyl-2-butyl-1,3-dibenzoyloxy propane, 2-isopropyl-2-isopentyl-1-benzoyloxy-3-butylcarboxyl propane, 2-isopropyl-2-isopentyl-1-benzoyloxy-3-cinnamylcarboxyl propane, 2-isopropyl-2-isopentyl-1-benzoyloxy-3-ethylcarboxyl propane, 2,2-dicyclopentyl-1,3-phenylcarboxyl propane, 2,2-dicyclohexyl-1,3-phenylcarboxyl propane, 2,2-dibutyl-1,3-phenylcarboxyl propane, 2,2-diisobutyl-1,3-phenylcarboxyl propane, 2,2-diisopropyl-1,3-diphenylcarboxyl propane, 2,2-diethyl-1,3-diphenylcarboxyl propane, 2-ethyl-2-butyl-1,3-diphenylcarboxyl propane, 2,4-dibenzoyloxy pentane, 3-ethyl-2,4-dibenzoyloxy pentane, 3-methyl-2,4-dibenzoyloxy pentane, 3-propyl-2,4-dibenzoyloxy pentane, 3-isopropyl-2,4-dibenzoyloxy pentane, 2,4-di(2-propylbenzoyloxy) pentane, 2,4-di(4-propylbenzoyloxy) pentane, 2,4-di(2,4-dimethylbenzoyloxy) pentane, 2,4-di(2,4-dichlorobenzoyloxy) pentane, 2,4-di(4-chlorobenzoyloxy) pentane, 2,4-di(4-isopropylbenzoyloxy) pentane, 2,4-di(4-butylbenzoyloxy) pentane, 2,4-di(4-isobutylbenzoyloxy) pentane, 3,5-dibenzoyloxy heptane, 4-ethyl-3,5-dibenzoyloxy heptane, 4-propyl-3,5-dibenzoyloxy heptane, 4-isopropyl-3,5-dibenzoyloxy heptane, 3,5-di(4-propylbenzoyloxy) heptane, 3,5-di(4-isopropylbenzoyloxy) heptane, 3,5-di(4-isobutylbenzoyloxy) heptane, 3,5-di(4-butylbenzoyloxy) heptane, 2-benzoyloxy-4-(4-isobutylbenzoyloxy) pentane, 2-benzoyloxy-4-(4-butylbenzoyloxy) pentane, 2-benzoyloxy-4-(4-propylbenzoyloxy) pentane, 3-benzoyloxy-5-(4-isobutylbenzoyloxy) heptane, 3-benzoyloxy-5-(4-butylbenzoyloxy) heptane, 3-benzoyloxy-5-(4-propylbenzoyloxy) heptane, 9,9-dibenzoyloxymethyl fluorene, 9,9-di(propylcarboxymethyl) fluorene, 9,9-di(isobutylcarboxymethyl) fluorene, 9,9-di(butylcarboxymethyl) fluorene, 9,9-dibenzoyloxymethyl-4-tertiarybutyl fluorene, 9,9-dibenzoyloxymethyl-4-propyl fluorene, 9,9-dibenzoyloxymethyl-1,2,3,4-tetrahydro fluorene, 9,9-dibenzoyloxymethyl-1,2,3,4,5,6,7,8-octahydro fluorene, 9,9-dibenzoyloxymethyl-2,3,6,7-diphenylpropylindene, 9,9-dibenzoyloxymethyl-1,8-dichloro fluorene, 7,7-dibenzoyloxymethyl-2,5-dinorbomadiene, 1,4-dibenzoyloxy butane, 2,3-diisopropyl-1,4-dibenzoyloxy butane, 2,3-dibutyl-1,4-dibenzoyloxy butane, 1,2-dibenzoyloxybenzene, 3-ethyl-1,2-dibenzoyloxy benzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 4-butyl-1,2-dibenzoyloxybenzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, 2-propyl-1,8-dibenzoyloxynaphthalene, and 4-propyl-1,8-dibenzoyloxynaphthalene.

44. The catalyst component according to claim 38, wherein said internal electron donor B is at least one selected from diether compounds as shown in Formula IV:

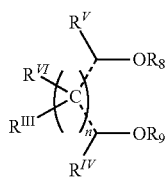

Formula IV wherein, $R_8$ and $R_9$ may be identical to or different from each other, and are independently selected from $C_1$-$C_{20}$ alkyl; $R^{III}$-$R^{VI}$ may be identical to or different from each other, and are independently selected from hydrogen, $C_1$-$C_{20}$ alkyl, $C_1$-$C_{20}$ cycloalkyl, $C_6$-$C_{20}$ aryl, $C_6$-$C_{20}$ alkylaryl, $C_6$-$C_{20}$ arylalkyl, and $C_2$-$C_{12}$ alkenyl, and $R^{III}$-$R^{VI}$ can be optionally bonded together to form a ring; n is an integer ranging from 0 to 10.

45. The catalyst component according to claim 44, wherein $R_8$ and $R_9$ may be identical to or different from each other, and are independently selected from $C_1$-$C_6$ alkyl; $R^{III}$-$R^{VI}$ may be identical to or different from each other, and are independently selected from hydrogen, $C_1$-$C_6$ alkyl, $C_3$-$C_6$ cycloalkyl, phenyl, substituted phenyl, benzyl, naphthalene, and $C_2$-$C_6$ alkenyl; n is an integer ranging from 0 to 2; $R^{III}$-$R^{VI}$ can be optionally bonded together to form a ring.

46. The catalyst component according to claim 45, wherein said ring is an alicyclic ring or aromatic ring.

47. The catalyst component according to claim 44, wherein said internal electron donor B is at least one selected from the group consisting of 2-isopropyl-1,3-dimethoxy propane, 2-butyl-1,3-dimethoxy propane, 2-cyclohexyl-1,3-dimethoxy propane, 2-benzyl-1,3-dimethoxy propane, 2-phenyl-1,3-dimethoxy propane, 2-(1-naphthyl)-1,3-dimethoxy propane, 2-isopropyl-2-isopentyl-1,3-dimethoxy propane, 2-isopropyl-2-isobutyl-1,3-dimethoxy propane, 2-isopropyl-2-butyl-1,3-dimethoxy propane, 2,2-dicyclopentyl-1,3-dibenzoyloxypropane, 2,2-dicyclohexyl-1,3-dimethoxy propane, 2,2-dibutyl-1,3-dimethoxy propane, 2,2-diisobutyl-1,3-dimethoxy propane, 2,2-diisopropyl-1,3-dimethoxy propane, 2,2-diethyl-1,3-dimethoxy propane, 2-ethyl-2-butyl-1,3-dimethoxy propane, 2,4-dimethoxy pentane, 3-ethyl-2,4-dimethoxy pentane, 3-methyl-2,4-dimethoxy pentane, 3-propyl-2,4-dimethoxy pentane, 3-isopropyl-2,4-dimethoxy pentane, 3,5-dimethoxy heptane, 4-ethyl-3,5-dimethoxy heptane, 4-propyl-3,5-dimethoxy heptane, 4-isopropyl-3,5-dimethoxy heptane, 9,9-dimethoxymethyl fluorene, 9,9-dimethoxymethyl-4-tertiary butyl fluorene, 9,9-dimethoxymethyl-4-propyl fluorene, 9,9-dimethoxymethyl-1,2,3,4-tetrahydro fluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichloro fluorene, 7,7-dimethoxymethyl-2,5-dinorbomadiene, 1,4-dimethoxy butane, 2,3-diisopropyl-1,4-dimethoxy butane, 2,3-dibutyl-1,4-dimethoxy butane, 1,2-dimethoxybenzene, 3-ethyl-1,2-dimethoxybeneze, 4-butyl-1,2-dimethoxybeneze, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

48. The catalyst component according to claim 37, wherein said internal electron donor B accounts for 0.01-20% by weight of the catalyst component; and/or the molar ratio of internal electron donor A to internal electron donor B is in a range from 1:10 to 10:1.

49. The catalyst component according to claim 48, wherein said internal electron donor B accounts for 1-15% by weight of the catalyst component; and/or the molar ratio of internal electron donor A to internal electron donor B is in a range from 0.2:1 to 1:5.

50. The catalyst component according to claim 49, wherein the molar ratio of internal electron donor A to internal electron donor B is in a range from 0.5:1 to 2:1.

51. A preparation method of the catalyst component according to claim 3, comprising:
contacting at least one magnesium compound and at least one titanium compound with at least one internal electron donor compound, so as to prepare the catalyst component, wherein the internal electron donor compound comprises internal electron donor A, and optionally, internal electron donor B, and the internal electron donor A is at least one selected from the compounds as shown in Formula II.

52. The method according to claim 51, wherein calculated in per mole of magnesium, the adding amount of the internal electron donor A is in a range from 0.001 mol to 10 mol; and/or the adding amount of the internal electron donor B is in a range from 0 mol to 10 mol.

53. The method according to claim 52, wherein calculated in per mole of magnesium, the adding amount of the internal electron donor A is in a range from 0.001 mol to 5 mol; and/or the adding amount of the internal electron donor B is in a range from 0 mol to 5 mol.

54. The method according to claim 53, wherein calculated in per mole of magnesium, the adding amount of the internal electron donor A is in a range from 0.01 mol to 3 mol; and/or the adding amount of the internal electron donor B is in a range from 0.01 mol to 3 mol.

55. A catalyst used for propene polymerization, comprising a reactant of the following components:
   a) the catalyst component according to claim 3;
   b) an organoaluminium compound; and
   c) optionally, an organosilicon compound.

56. The catalyst according to claim 55, wherein the molar ratio of the organoaluminium compound b) to the catalyst component a), calculated in the ratio of aluminium/titanium, is in a range from 10:1 to 800:1, and/or the molar ratio of the organosilicon compound c) to the catalyst component a), calculated in the ratio of silicon to titanium, is in a range from 0:1 to 100:1.

57. A prepolymerization catalyst used for propene polymerization, comprising a prepolymer obtained by the prepolymerization of propene with the catalyst component according to claim 3.

58. A method for propene polymerization, comprising the step of polymerization of propene which is performed in the presence of the catalyst component according to claim 3, wherein said polymerization comprises homopolymerization or copolymerization.

59. A catalyst component for propene polymerization, comprising titanium, magnesium, halogen and internal electron donor A, wherein said internal electron donor A is at least one selected from the group consisting of 2-(2,6-diisopropylphenylimino)methyl-4,6-dimethylphenol, 2-(2,6-diisopropylphenylimino)methyl-6-phenyl phenol, 2-(2,6-diisopropylphenylimino)methyl-4-isopropylphenol, 2-(2,6-diisopropylphenylimino)methyl-4-tertiary butylphenol, 2-(2,6-diisopropylphenylimino)methyl-4,6-ditertiary butylphenol, 2-(2,6-diisopropylphenylimino)methyl-4,6-dimethylphenol, 2-(2,6-dimethylphenylimino)methyl-4-ditertiary butylphenol, 2-(2,6-dimethylphenylimino)methyl-4,6-ditertiary butylphenol, N-(2-methoxy-5-tertiary butylphenylmethylene)-2,6-diisopropylaniline, N-(2-methoxy-5-tertiary butylphenylmethylene)-2,6-dimethylaniline, 2-(2,6-dimethylphenylimino)methyl-4-methoxy-6-tertiary butylphenol, 2-(4-chlorophenylimino)methyl-4,6-ditertiary butylphenol, N-p-chlorophenylmethylene-2,6-diisopropylaniline, N-(4-tertiary butylphenylmethylene)-2,6-diisopropylaniline, N-(2,4-dichlorophenylmethylene)-2,6-dimethylaniline, N-(2,4,6-trifluorophenylmethylene)-2,6-dimethylaniline, 2-(2,3,4,5,6-pentafluorophenylimino)methyl-4,6-ditertiary butylphenol, N-(2-methoxynaphthylmethylene)-2,6-diisopropylaniline, 2-(2,6-diisopropylphenylimino)methylphenol, 2-(2,6-dimethylphenylimino)methyl-6-tertiary butylphenol, 2-(2,6-diisopropylphenylimino)methyl-6-tertiary butylphenol, N-(2-methoxy-3-tertiary butylphenylmethylene)-2,6-diisopropylaniline, 2-(3,5-ditertiary butyl-2-hydroxy) benzyliminophenol, and 2-(3,5-ditertiary butyl-2-hydroxy-benzylimino-1-naphthol.

60. The catalyst component according to claim 59, wherein said internal electron donor A accounts for 0.01%-20% by weight of the catalyst component.

61. The catalyst component according to claim 60, wherein said internal electron donor A accounts for 0.5%-15% by weight of the catalyst component.

62. The catalyst component according to claim 61, wherein said internal electron donor A accounts for 2%-10% by weight of the catalyst component.

63. The catalyst component according to claim 59, wherein the catalyst component further comprises internal electron donor B, which is at least one selected from the group consisting of esters, ethers, ketones, and amines.

64. The catalyst component according to claim 63, wherein the internal electron donor B is at least one selected from the group consisting of polycarboxylic acid ester compounds, diol ester compounds, and diether compounds.

65. The catalyst component according to claim 64, wherein said internal electron donor B is at least one selected from the group consisting of 2,3-bis(2-ethylbutyl)succinic acid diethyl ester, 2,3-diethyl-2-isopropylsuccinic acid diethyl ester, 2,3-diisopropylsuccinic acid diethyl ester, 2,3-ditertiary butylsuccinic acid diethyl ester, 2,3-diisobutylsuccinic acid diethyl ester, 2,3-(bistrimethylsilylalkyl)succinic acid diethyl ester, 2-(3,3,3-trifluoropropyl)-3-methyl succinic acid diethyl ester, 2,3-dineopentyl succinic acid diethyl ester, 2,3-diisopentyl succinic acid diethyl ester, 2,3-(1-trifluoromethyl-ethyl)succinic acid diethyl ester, 2-isopropyl-3-isobutyl succinic acid diethyl ester, 2-tertiary butyl-3-isopropyl succinic acid diethyl ester, 2-isopropyl-3-cyclohexyl succinic acid diethyl ester, 2-isopentyl-3-cyclohexyl succinic acid diethyl ester, 2,2,3,3-tetramethyl succinic acid diethyl ester, 2,2,3,3-tetraethyl succinic acid diethyl ester, 2,2,3,3-tetrapropyl succinic acid diethyl ester, 2,3-diethyl-2,3-diisopropyl disuccinic acid diethyl ester, 2,3-bis(2-ethylbutyl)succinic acid diisobutyl ester, 2,3-diethyl-2-isopropylsuccinic acid diisobutyl ester, 2,3-diisopropylsuccinic acid diisobutyl ester, 2,3-ditertiary butylsuccinic acid diisobutyl ester, 2,3-diisobutylsuccinic acid diisobutyl ester, 2,3-(bistrimethylsilylalkyl)succinic acid diisobutyl ester, 2-(3,3,3-trifluoropropyl)-3-methylsuccinic acid diisobutyl ester, 2,3-dineopentylsuccinic acid diisobutyl ester, 2,3-diisopentylsuccinic acid diisobutyl ester, 2,3-(1-trifluoromethyl-ethyl)succinic acid diisobutyl ester, 2-isopropyl-3-isobutyl succinic acid diisobutyl ester, 2-tertiary butyl-3-isopropylsuccinic acid diisobutyl ester, 2-isopropyl-3-cyclohexylsuccinic acid diisobutyl ester, 2-isopentyl-3-cyclohexylsuccinic acid diisobutyl ester, 2,2,3,3-tetramethylsuccinic acid diisobutyl ester, 2,2,3,3-tetraethylsuccinic acid diisobutyl ester, 2,2,3,3-tetrapropylsuccinic acid diisobutyl ester, 2,3-diethyl-2,3-diisopropyl disuccinic acid diisobutyl ester, diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methyl phthalate, di-n-butyl 2-methyl phthalate, diisobutyl 2-propyl phthalate, di-n-butyl 2-propyl phthalate, diisobutyl 2-butyl phthalate, din-butyl 2-butyl phthalate, diisobutyl 2-propyl phthalate, di-n-butyl 2-propyl phthalate, diisobutyl 4-propyl phthalate, di-n-butyl 4-butyl phthalate, diisobutyl 2-chloro phthalate, di-n-butyl 2-chloro phthalate, diisobutyl 4-chloro phthalate, di-n-butyl 4-chloro phthalate, and di-n-butyl 4-methoxy phthalate.

66. The catalyst component according to claim 64, wherein said internal electron donor B is at least one selected from diol ester compounds as shown in Formula III:

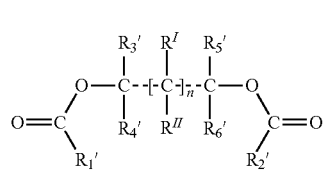

Formula III wherein, $R_1'$ and $R_2'$ may be identical to or different from each other, and are independently selected from $C_1$-$C_{20}$ alkyl, $C_6$-$C_{20}$ aryl, $C_7$-$C_{20}$ arylalkyl, and $C_7$-$C_{20}$ alkylaryl; $R_3'$-$R_6'$ may be identical to or different from each other, and are independently selected from hydrogen, $C_1$-$C_{20}$ alkyl, $C_6$-$C_{20}$ aryl, and $C_2$-$C_{12}$ alkenyl; $R^I$ and $R^{II}$ may be identical to or different from each other, and are independently selected from hydrogen, $C_1$-$C_{20}$ alkyl, $C_1$-$C_{20}$ crycloalkyl, $C_6$-$C_{20}$ aryl, $C_7$-$C_{20}$ arylalkyl, $C_9$-$C_2$ fused ring hydrocarbyl, and $C_2$-$C_{12}$ alkenyl; $R_3'$, $R_4'$, $R_5'$, $R_6'$, $R^I$, and $R^{II}$ can be optionally bonded together to form a ring; n is an integer ranging from 0 to 10.

67. The catalyst component according to claim 66, wherein $R_1'$ and $R_2'$ may be identical to or different from each other, and are independently selected from $C_1$-$C_6$ alkyl, phenyl, substituted phenyl, and cinnamyl; $R_3'$-$R_6'$ may be identical to or different from each other, and are independently selected from hydrogen, $C_1$-$C_6$ alkyl, phenyl, substituted phenyl, and $C_2$-$C_6$ alkenyl; $R^I$ and $R^{II}$ may be identical to or different from each other, and are independently selected from hydrogen, $C_1$-$C_6$ alkyl, $C_1$-$C_6$ crycloalkyl, benzyl, phenyl, substituted phenyl, naphthyl, and $C_2$-$C_6$ alkenyl; n is an integer ranging from 0 to 2; $R_3'$, $R_4'$, $R_5'$, $R_6'$, $R^I$, and $R^{II}$ can be optionally bonded together to form a ring.

68. The catalyst component according to claim 67, wherein said ring is an alicyclic ring or aromatic ring.

69. The catalyst component according to claim 66, wherein said internal electron donor B is at least one selected from the group consisting of 2-isopropyl-1,3-dibenzoyloxy propane, 2-butyl-1,3-dibenzoyloxy propane, 2-cyclohexyl-1,3-dibenzoyloxy propane, 2-benzyl-1,3-dibenzoyloxy propane, 2-phenyl-1,3-dibenzoyloxy propane, 2-(1-naphthyl)-1,3-dibenzoyloxy propane, 2-isopropyl-1,3-diethylcarboxylpropane, 2-isopropyl-2-isopentyl-1,3-dibenzoyloxy propane, 2-isopropyl-2-isobutyl-1,3-dibenzoyloxy propane, 2-isopropyl-2-isopentyl-1,3-di(4-butylbenzoyloxy) propane, 2-isopropyl-2-isopentyl-1,3-dipropylcarboxyl propane, 2-isopropyl-2-butyl-1,3-dibenzoyloxy propane, 2-isopropyl-2-isopentyl-1-benzoyloxy-3-butylcarboxyl propane, 2-isopropyl-2-isopentyl-1-benzoyloxy-3-cinnamylcarboxyl propane, 2-isopropyl-2-isopentyl-1-benzoyloxy-3-ethylcarboxyl propane, 2,2-dicyclopentyl-1,3-phenylcarboxyl propane, 2,2-dicyclohexyl-1,3-phenylcarboxyl propane, 2,2-dibutyl-1,3-phenylcarboxyl propane, 2,2-diisobutyl-1,3-phenylcarboxyl propane, 2,2-diisopropyl-1,3-diphenylcarboxyl propane, 2,2-diethyl-1,3-diphenylcarboxyl propane, 2-ethyl-2-butyl-1,3-diphenylcarboxyl propane, 2,4-dibenzoyloxy pentane, 3-ethyl-2,4-dibenzoyloxy pentane, 3-methyl-2,4-dibenzoyloxy pentane, 3-propyl-2,4-dibenzoyloxy pentane, 3-isopropyl-2,4-dibenzoyloxy pentane, 2,4-di(2-propylbenzoyloxy) pentane, 2,4-di(4-propylbenzoyloxy) pentane, 2,4-di(2,4-dimethylbenzoyloxy) pentane, 2,4-di(2,4-dichlorobenzoyloxy) pentane, 2,4-di(4-chlorobenzoyloxy) pentane, 2,4-di(4-isopropylbenzoyloxy) pentane, 2,4-di(4-butylbenzoyloxy) pentane, 2,4-di(4-isobutylbenzoyloxy) pentane, 3,5-dibenzoyloxy heptane, 4-ethyl-3,5-dibenzoyloxy heptane, 4-propyl-3,5-dibenzoyloxy heptane, 4-isopropyl-3,5-dibenzoyloxy heptane, 3,5-di(4-propylbenzoyloxy) heptane, 3,5-di(4-isopropylbenzoyloxy) heptane, 3,5-di(4-isobutylbenzoyloxy) heptane, 3,5-di(4-butylbenzoyloxy) heptane, 2-benzoyloxy-4-(4-isobutylbenzoyloxy) pentane, 2-benzoyloxy-4-(4-butylbenzoyloxy) pentane, 2-benzoyloxy-4-(4-propylbenzoyloxy) pentane, 3-benzoyloxy-5-(4-isobutylbenzoyloxy) heptane, 3-benzoyloxy-5-(4-butylbenzoyloxy) heptane, 3-benzoyloxy-5-(4-propylbenzoyloxy) heptane, 9,9-dibenzoyloxymethyl fluorene, 9,9-di(propylcarboxylmethyl) fluorene, 9,9-di(isobutylcarboxylmethyl) fluorene, 9,9-di(butylcarboxylmethyl) fluorene, 9,9-dibenzoyloxymethyl-4-tertiarybutyl fluorene, 9,9-dibenzoyloxymethyl-4-propyl fluorene, 9,9-dibenzoyloxymethyl-1,2,3,4-tetrahydro fluorene, 9,9-dibenzoyloxymethyl-1,2,3,4,5,6,7,8-octahydro fluorene, 9,9-dibenzoyloxymethyl-2,3,6,7-diphenylpropylindene, 9,9-dibenzoyloxymethyl-1,8-dichloro fluorene, 7,7-dibenzoyloxymethyl-2,5-dinorbomadiene, 1,4-dibenzoyloxy butane, 2,3-diisopropyl-1,4-dibenzoyloxy butane, 2,3-dibutyl-1,4-dibenzoyloxy butane, 1,2-dibenzoyloxybenzene, 3-ethyl-1,2-dibenzoyloxy benzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butyl benzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 4-butyl-1,2-dibenzoyloxybenzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, 2-propyl-1,8-dibenzoyloxynaphthalene, and 4-propyl-1,8-dibenzoyloxynaphthalene.

70. The catalyst component according to claim 64, wherein said internal electron donor B is at least one selected from diether compounds as shown in Formula IV:

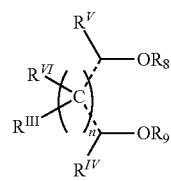

Formula IV wherein, $R_8$ and $R_9$ may be identical to or different from each other, and are independently selected from $C_1$-$C_{20}$ alkyl; $R^{III}$-$R^{VI}$ may be identical to or different from each other, and are independently selected from hydrogen, $C_1$-$C_{20}$ alkyl, $C_1$-$C_{20}$ cycloalkyl, $C_6$-$C_{20}$ aryl, $C_6$-$C_{20}$ alkylaryl, $C_6$-$C_{20}$ arylalkyl, and $C_2$-$C_{12}$ alkenyl, and $R^{III}$-$R^{VI}$ can be optionally bonded together to form a ring; n is an integer ranging from 0 to 10.

71. The catalyst component according to claim 70, wherein $R_8$ and $R_9$ may be identical to or different from each other, and are independently selected from $C_1$-$C_6$ alkyl; $R^{III}$-$R^{VI}$ may be identical to or different from each other, and are independently selected from hydrogen, $C_1$-$C_6$ alkyl, $C_3$-$C_6$ cycloalkyl, phenyl, substituted phenyl, benzyl, naphthalene, and $C_2$-$C_6$ alkenyl; n is an integer ranging from 0 to 2; $R^{III}$-$R^{VI}$ can be optionally bonded together to form a ring.

72. The catalyst component according to claim 71, wherein said ring is an alicyclic ring or aromatic ring.

73. The catalyst component according to claim 70, wherein said internal electron donor B is at least one selected from the group consisting of 2-isopropyl-1,3-dimethoxy propane, 2-butyl-1,3-dimethoxy propane, 2-cyclohexyl-1,3-dimethoxy propane, 2-benzyl-1,3-dimethoxy propane, 2-phenyl-1,3-dimethoxy propane, 2-(1-naphthyl)-1,3-dimethoxy propane, 2-isopropyl-2-isopentyl-1,3-dimethoxy propane, 2-isopropyl-2-isobutyl-1,3-dimethoxy propane, 2-isopropyl-2-butyl-1,3-dimethoxy propane, 2,2-dicyclopentyl-1,3-dibenzoyloxypropane, 2,2-dicyclohexyl-1,3-dimethoxy propane, 2,2-dibutyl-1,3-dimethoxy propane, 2,2-diisobutyl-1,3-dimethoxy propane, 2,2-diisopropyl-1,3-dimethoxy propane, 2,2-diethyl-1,3-dimethoxy propane, 2-ethyl-2-butyl-1,3-dimethoxy propane, 2,4-dimethoxy pentane, 3-ethyl-2,4-dimethoxy pentane, 3-methyl-2,4-dimethoxy pentane, 3-propyl-2,4-dimethoxy pentane, 3-isopropyl-2,4-dimethoxy pentane, 3,5-dimethoxy heptane, 4-ethyl-3,5-dimethoxy heptane, 4-propyl-3,5-dimethoxy heptane, 4-isopropyl-3,5-dimethoxy heptane, 9,9-dimethoxymethyl fluorene, 9,9-dimethoxymethyl-4-tertiary butyl fluorene, 9,9-dimethoxymethyl-4-propyl fluorene, 9,9-dimethoxymethyl-1,2,3,4-tetrahydro fluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichloro fluorene, 7,7-dimethoxymethyl-2,5-dinorbomadiene, 1,4-dimethoxy butane, 2,3-diisopropyl-1,4-dimethoxy butane, 2,3-dibutyl-1,4-dimethoxy butane, 1,2-dimethoxybenzene, 3-ethyl-1,2-dimethoxybeneze, 4-butyl-1,2-dimethoxybeneze, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

74. The catalyst component according to claim 63, wherein said internal electron donor B accounts for 0.01-20% by weight of the catalyst component; and/or the molar ratio of internal electron donor A to internal electron donor B is in a range from 1:10 to 10:1.

75. The catalyst component according to claim 74, wherein said internal electron donor B accounts for 1-15% by weight of the catalyst component; and/or the molar ratio of internal electron donor A to internal electron donor B is in a range from 0.2:1 to 1:5.

76. The catalyst component according to claim 75, wherein the molar ratio of internal electron donor A to internal electron donor B is in a range from 0.5:1 to 2:1.

77. A preparation method of the catalyst component according to claim 59, comprising:
contacting at least one magnesium compound and at least one titanium compound with at least one internal electron donor compound, so as to prepare the catalyst component, wherein the internal electron donor compound comprises internal electron donor A, and optionally, internal electron donor B.

78. The method according to claim 77, wherein calculated in per mole of magnesium, the adding amount of the internal electron donor A is in a range from 0.001 mol to 10 mol; and/or the adding amount of the internal electron donor B is in a range from 0 mol to 10 mol.

79. The method according to claim 78, wherein calculated in per mole of magnesium, the adding amount of the internal electron donor A is in a range from 0.001 mol to 5 mol; and/or the adding amount of the internal electron donor B is in a range from 0 mol to 5 mol.

80. The method according to claim 79, wherein calculated in per mole of magnesium, the adding amount of the internal electron donor A is in a range from 0.01 mol to 3 mol; and/or the adding amount of the internal electron donor B is in a range from 0.01 mol to 3 mol.

81. A catalyst used for propene polymerization, comprising a reactant of the following components:
a) the catalyst component according to claim 59;
b) an organoaluminium compound; and
c) optionally, an organosilicon compound.

82. The catalyst according to claim 81, wherein the molar ratio of the organoaluminium compound b) to the catalyst component a), calculated in the ratio of aluminium/titanium, is in a range from 10:1 to 800:1, and/or the molar ratio of the organosilicon compound c) to the catalyst component a), calculated in the ratio of silicon to titanium, is in a range from 0:1 to 100:1.

83. A prepolymerization catalyst used for propene polymerization, comprising a prepolymer obtained by the prepolymerization of propene with the catalyst component according to claim 59.

84. A method for propene polymerization, comprising the step of polymerization of propene which is performed in the presence of the catalyst component according to claim 59, wherein said polymerization comprises homopolymerization or copolymerization.

* * * * *

UNITED STATES PATENT AND TRADEMARK OFFICE
CERTIFICATE OF CORRECTION

PATENT NO. : 10,184,017 B2  
APPLICATION NO. : 15/306247  
DATED : January 22, 2019  
INVENTOR(S) : Jun Wang et al.

Page 1 of 1

It is certified that error appears in the above-identified patent and that said Letters Patent is hereby corrected as shown below:

On the Title Page

Item (30), under Foreign Application Priority Data:
"Apr. 24, 2014 (CN) ....... 2014 1 0168579  
Apr. 24, 2014 (CN) ....... 2014 1 0168730  
Apr. 24, 2014 (CN) ....... 2014 1 0168779  
Apr. 24, 2014 (CN) ....... 2014 1 0168798  
Apr. 24, 2014 (CN) ....... 2014 1 0168805  
Apr. 24, 2014 (CN) ....... 2014 1 0169225"  
Should read:  
-- Apr. 24, 2014 (CN) ....... 2014 1 0168579.2  
Apr. 24, 2014 (CN) ....... 2014 1 0168730.2  
Apr. 24, 2014 (CN) ....... 2014 1 0168779.8  
Apr. 24, 2014 (CN) ....... 2014 1 0168798.0  
Apr. 24, 2014 (CN) ....... 2014 1 0168805.7  
Apr. 24, 2014 (CN) ....... 2014 1 0169225.X --.

In the Claims

Claim 2, Column 42, Line 43, after "unsubstituted" delete "." and add -- C7-C20 arylalkyl. --.

Claim 66, Column 55, Line 4, "C9-C2 fused ring" should read -- C9-C20 fused ring --.

Signed and Sealed this  
Twenty-third Day of July, 2019

Andrei Iancu  
*Director of the United States Patent and Trademark Office*